US012710916B2

(12) United States Patent
Guajardo

(10) Patent No.: US 12,710,916 B2
(45) Date of Patent: Aug. 18, 2026

(54) SMART ADJUSTMENT OF AUDIO CONTENT PLAYBACK SETTINGS IN A CLIENT DEVICE

(71) Applicant: GOOGLE LLC, Mountain View, CA (US)

(72) Inventor: Jaime Guajardo, Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 70 days.

(21) Appl. No.: 18/430,243

(22) Filed: Feb. 1, 2024

(65) Prior Publication Data

US 2025/0284450 A1 Sep. 11, 2025

Related U.S. Application Data

(60) Provisional application No. 63/619,211, filed on Jan. 9, 2024.

(51) Int. Cl.

| | |
|---|---|
| ***G06F 3/16*** | (2006.01) |
| ***G06F 16/3329*** | (2025.01) |
| ***G06F 16/387*** | (2019.01) |

(52) U.S. Cl.
CPC ........ *G06F 3/165* (2013.01); *G06F 16/33295* (2025.01); *G06F 16/387* (2019.01)

(58) Field of Classification Search
None
See application file for complete search history.

(56) References Cited

U.S. PATENT DOCUMENTS

| | | | |
|---|---|---|---|
| 2008/0025698 A1 | 1/2008 | Momosaki et al. | |
| 2009/0016540 A1 | 1/2009 | Heningsen Nielsen et al. | |
| 2020/0110577 A1* | 4/2020 | Rodgers | G06F 3/167 |
| 2020/0184968 A1 | 6/2020 | Han | |
| 2021/0255820 A1 | 8/2021 | Delaney et al. | |
| 2021/0397407 A1* | 12/2021 | Eubank | G10K 11/17885 |
| 2022/0061695 A1 | 3/2022 | Grace et al. | |
| 2022/0130392 A1 | 4/2022 | Ko | |

(Continued)

OTHER PUBLICATIONS

European Patent Office; Invitation to Pay Additional Fees issued in Application No. PCT/US2025/010478; 12 pages; dated Apr. 3, 2025.

(Continued)

*Primary Examiner* — Hemant S Patel
(74) *Attorney, Agent, or Firm* — Gray Ice Higdon

(57) ABSTRACT

Implementations relate to modifying one or more audio content playback settings of a client device. Processor(s) can receive one or more contextual signals associated with the client device or a user of the client device and can generate, based on at least the one or more contextual signals and a predefined context, a structured large language model (LLM) query. The processor(s) can generate, based on processing the structured LLM query, an LLM output that includes at least an indication of whether the client device or the user is in the predefined context. The processor(s) can determine, based on processing the indication, whether the client device or the user device is in the predefined context and, responsive to determining that the client device or the user is in the predefined context, modify one or more audio content playback settings of the client device for rendering audio content.

19 Claims, 9 Drawing Sheets

(56) References Cited

U.S. PATENT DOCUMENTS

2023/0353827 A1 11/2023 Carbune
2024/0419390 A1 * 12/2024 Candelore ............ H04R 1/1041

OTHER PUBLICATIONS

European Patent Office; International Search Report and Written Opinion issued in Application No. PCT/US2025/010478; 20 pages; dated May 27, 2025.
MDN, "autoplay guide for media and Web Audio API's" MDN Web Docs, https://developer.mozilla.org/en-US/docks/Web/Media/Autoplay_guide, 14 pages, dated Jul. 23, 2025.

* cited by examiner

SMART ADJUSTMENT OF AUDIO CONTENT PLAYBACK SETTINGS IN A CLIENT DEVICE

BACKGROUND

Certain client devices such as mobile phones or tablets may be able to audibly and/or visibly render multimedia content such as music or videos. However, where audio content is being rendered, it may be undesirable to render the audio content at a high playback volume in certain environments or scenarios. For example, it may be undesirable to begin rendering audio content at a high playback volume when the client device is being used late at night, or when the client device is being used in a certain type of location such as a library or a place of worship.

The rendering of audio content at a high playback volume may be particularly undesirable in instances where the client device automatically begins rendering the audio data without first receiving explicit user input to do so (i.e., "auto-plays"). For example, a user may open a media application on the client device and the media application may begin auto-playing audio content without the user having explicitly selected the audio content for rendering. In such instances, the user may not be aware that audio content will automatically begin rendering, or that the audio content will begin rendering at a high volume. Furthermore, in such instances, the user may be provided with insufficient time to prevent the rendering of the audio content at the high volume. It is beneficial to provide improved control over the rendering of audio content at a client device.

SUMMARY

Implementations described herein relate to determining whether to modify one or more settings of a client device, such as one or more audio content playback settings for rendering audio content. Processor(s) can generate a structured large language model (LLM) query that can be processed to generate LLM output. Notably, the structured LLM query can be generated based on a predefined context and one or more contextual signals associated with the client device or a user of the client device, while the LLM output can include an indication of whether the client device or the user of the client device is in the predefined context. The predefined context may be a context of the client device or the user that has been previously defined by the user or a third party. Responsive to determining, based on processing the indication in the LLM output, that the client device or the user of the client device is in the predefined context, one or more audio content playback settings of the client device for rendering audio content can be caused to be modified, for example a playback volume for rendering the audio content can be reduced. Accordingly, an LLM can be utilized to determine whether the client device or the user of the client device is in a predefined context in which one or more audio content playback settings of the client device should be modified.

For example, assume that a user of the client device launches a software application that is capable of rendering audio content such as a song. In this example, the user launching the software application (or providing other input indicating a desire to initiate the rendering of the audio content via the software application) can be initially utilized as a trigger to generate the structured LLM query. Further assume that the processor(s) generate the structured LLM query based on at least one or more contextual signals associated with the client device or the user of the client device, and a predefined context (e.g., a predefined context that the client device is in a library). Further assume that the processor(s) cause an LLM (e.g., that was previously fine-tuned to handle processing the structured LLM query) to process the structured LLM query to generate the LLM output that includes the indication of whether the client device or user is in the predefined context (e.g., that the client device is indeed in a library). In this example, the one or more contextual signals can include one or more of a location of the client device, a location of the user, an ambient noise level in an environment of the client device, a type of noise detected in the environment of the client device, a current time, a current day, a calendar entry, and/or one or more other contextual signals. Accordingly, the LLM can leverage the one or more contextual signals to determine whether the client device or the user is in the predefined context. Assume that the processor(s) determines, based on processing the indication in the LLM output, that the client device is in the predefined context. In response, the processor(s) may cause one or more audio content playback settings of the client device for rendering audio content to be modified, for example a playback volume for rendering the audio content can be reduced. Accordingly, the client device can be prevented from rendering audio content at a high playback volume when it is determined that the client device is in a library. This may be particularly beneficial where, for example, a software application of the client device is arranged to auto-play audio content.

Accordingly, an LLM can be utilized to determine whether a client device or a user of the client device is in a predefined context, the predefined context being a context in which one or more audio content playback settings of the client device should be modified. Aspects of the various techniques disclosed herein may allow for improved robustness in determining whether a client device or a user of the client device is in a given context, for example due at least in part to the utilization of the LLM. Aspects of the various techniques disclosed herein may additionally or alternatively allow for a wide variety of contexts to be easily monitored, without necessarily specifying beforehand the particular ranges or values that the contextual signals must match in order for a positive determination that the client device or user is in the predefined context. Aspects of the various techniques disclosed herein may additionally or alternatively allow for smarter, more flexible customization in the detection of contexts and/or in the determination of when to modify settings of a client device.

In some versions of those implementations, the processor(s) can cause the client device to initiate the rendering of the audio content based on the modified one or more media content playback settings, subsequent to modifying the one or more audio content playback settings of the client device. Accordingly, the one or more audio content playback settings may be modified prior to audio content being rendered, so that the audio content can be rendered using the modified settings. For example, in some of these implementations, a playback volume for rendering the audio content can be reduced prior to the audio content being rendered such that audio content may initially be rendered at the reduced playback volume.

In some implementations, processors(s) can receive a natural language (NL) based input, the NL based input comprising a description of a context, the context being of a client device or a user of the client device; generate, based on at least the description of the context, a structured large language model (LLM) query; generate, based on processing the structured LLM query, an LLM output that includes one or more expected contextual signals that are indicative of the client device or the user being in the context; receive one or more current contextual signals associated with at least one of the client device and the user of the client device; determine, based on the one or more current contextual signals and the one or more expected contextual signals, whether the client device or the user of the client device is in the context; and responsive to determining that the client device or the user of the client device is in the context, modify one or more settings of the client device. Accordingly, a user of a client device (or a third party) may be able to provide a natural language description of a context for a client device or the user of the client device, where the context may not have been previously defined. As such, it may not initially be evident how the processor(s) can determine whether the client device or user is in the context. However, by generating a structured LLM query based on the description of the context and by processing the structured LLM query using an LLM, an LLM output can be generated that includes one or more expected contextual signals, wherein the one or more expected contextual signals are indicative of the client device or the user being in the context. That is, the LLM output may provide expected contextual signals that could be compared to current contextual signals associated with the client device or the user to determine whether the client device or the user is in the newly-specified context. Accordingly, aspects of the various techniques disclosed herein may allow for new contexts to be defined using NL based inputs, and for those contexts to be monitored.

In some implementations, processors(s) can receive a user input to initiate rendering of audio content at a client device; receive one or more contextual signals associated with a current context of the client device or a user of the client device; determine, based on the one or more contextual signals, whether the client device or the user is in a predefined context; and responsive to receiving the user input and determining that the client device or the user is in the predefined context, cause the client device to initiate rendering the audio content at a playback volume than is initially lower than if the audio content were rendered while the client device was in the first media playback mode and subsequently ramping up the playback volume. Accordingly, aspects of the various techniques disclosed herein may allow for the determination of whether a client device or a user of the client device is in a particular context (such as in a context where playing loud music would be inappropriate) and, responsive to a positive determination, allow for audio content to be initially rendered at a lower playback volume than if the client device or user were not in the context, with the playback volume subsequently being ramped up. In some instances, the user may prefer that the audio content is rendered at a normal (e.g., non-reduced) playback volume, therefore ramping up the playback volume after reducing the playback volume may allow for the audio content to eventually be rendered at the higher, 'normal' playback volume, without requiring further input from the user to increase the playback volume. Furthermore, the ramping also provides the user with an opportunity to reduce the playback volume during the ramping, should the user instead agree that the audio content should be rendered at the reduced playback volume.

In some versions of those implementations, the rate at which the playback volume is ramped up may be selected by the processor(s) based on the predefined context. For example, a plurality of different contexts may have been predefined by a user, with each predefined context having a different respective rate at which the playback volume is to be ramped up. For example, a first predefined context of 'client device is in a church' may be associated with a relatively low rate for ramping up (e.g., to provide the user with more time to prevent the ramping up), whereas a second predefined context of 'user is driving' may be associated with a relatively higher rate for ramping up (e.g., because there is a greater likelihood while the user is driving that they intentionally wish to listen to audio content at a normal playback volume, and therefore a relatively slow ramping may be an annoyance to the user).

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

DETAILED DESCRIPTION OF THE DRAWINGS

Figure 1:
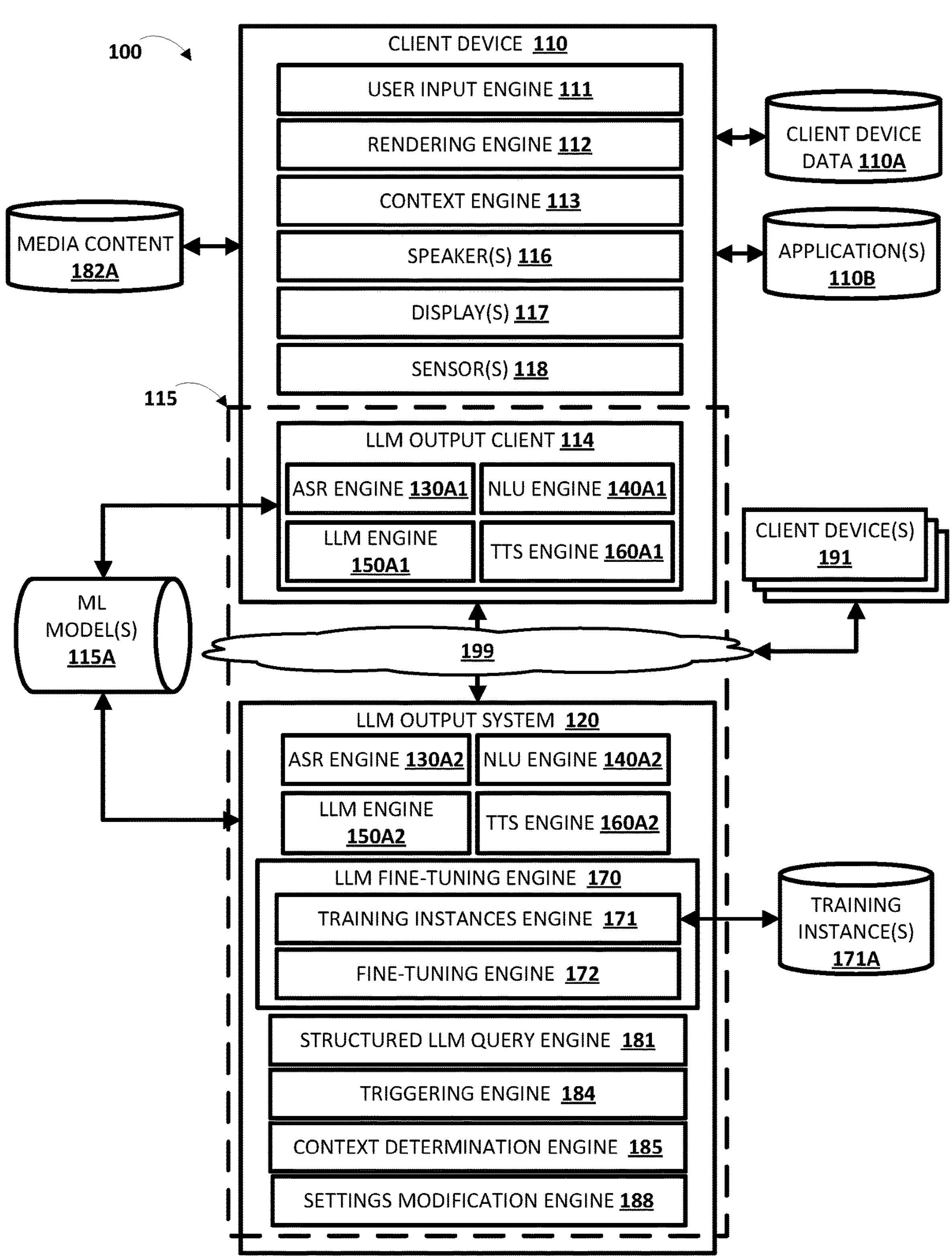
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a large language model (LLM) output system 120. In some implementations, the LLM output system 120 can be implemented locally at the client device 110. In additional or alternative implementations, the LLM output system 120 can be implemented remotely from the client device 110 as depicted in FIG. 1 (e.g., at remote server(s)). In these implementations, the client device 110 and the LLM output system 120 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an LLM output client 114. An instance of the LLM output client 114 can be an application that is separate from an operating system of the client device 110 (e.g., installed "on top" of the operating system)—or can alternatively be implemented directly by the operating system of the client device 110. The LLM output client 114 can interact with the LLM output system 120 implemented locally at the client device 110 or via one or more of the networks 199 as depicted in FIG. 1. The LLM output client 114 (and optionally by way of its interactions with other remote system (e.g., server(s)) may form what appears to be, from a user's perspective, a logical instance of an automated assistant that leverages the capabilities of an LLM and with which the user may optionally engage in a human-to-computer dialog. An instance of the automated assistant 115 is depicted in FIG. 1, and is encompassed by a dashed line that includes the LLM output client 114 of the client device 110 and the LLM output system 120. It thus should be understood that a user that engages with the LLM output client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the LLM output client 114 executing locally on the client device 110 and/or executing remotely at one or more remote servers that may implement the LLM output system 120.

In various implementations, the client device 110 may include a user input engine 111 that is configured to detect natural language (NL) based input provided by a user of the client device 110 and/or other user inputs using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. However, it should be understood that, in various implementations, NL based input is not required to leverage the capabilities of the automated assistant 115.

In various implementations, the client device 110 may include a rendering engine 112 that is configured to render media content (which may comprise audio content) for audible and/or visual presentation to a user of the client device 110 using one or more user interface output devices. For example, the client device 110 may be equipped with one or more speakers 116 that enable audio content to be provided for audible presentation to the user via the client device 110. Additionally, or alternatively, the client device 110 may be equipped with a display 117 or connected to another client device that includes a display or projector that enables visual content to be provided for visual presentation to the user via the client device 110.

In various implementations, the client device 110 may include one or more sensors 118 that are configured to generate and output sensor data. The one or more sensors 118 could include one or more of an accelerometer, a gyroscope, a proximity sensor, a microphone, a camera, an ambient light sensor, a barometer, an altimeter, Near Field Communication (NFC) sensor, a location sensor (e.g., that utilizes one or more global navigation satellite systems such as GPS, GLONASS, Galileo or BeiDou), a temperature sensor, a humidity sensor, a heart rate sensor, a fingerprint sensor, a magnetometer, a touch sensor, a WiFi sensor, a Bluetooth sensor, a LiDAR sensor and/or a pulse oximeter.

In various implementations, the client device 110 (or the LLM output system 120) may include a context engine 113 that is configured to obtain and/or generate one or more contextual signals that are associated with a context (e.g., current or recent context) of the client device 110 and/or of a user of the client device 110 (e.g., an active user of the client device 110 when the client device 110 is associated with multiple users). In some examples, the one or more contextual signals can include data stored in client device data database 110A. The data stored in the client device data database 110A can include, for example, user interaction data that characterizes current or recent interaction(s) of the client device 110 and/or recent interaction(s) of a user with the client device 110, location data that characterizes a current or recent location(s) of the client device 110 and/or current or recent location(s) of a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113.

For example, contextual signals may include one or more of a location of the client device 110, a location of the user, an ambient noise level in an environment of the client device 110, a type of noise detected in the environment of the client device 110 (e.g. an identity of the source of the noise, or another characteristic of the noise), a current time of day at a current location of the client device 110 or user, a day of week at a current location of the client device 110 or user, a season of the year at a current location of the client device 110 or the user, and/or a calendar entry associated with the user (e.g., which may indicate a possible event being attended by the user, a possible activity being performed by the user, and/or a potential location of the user, and wherein the calendar entry may, for example, be retrieved from the client device data database 110A).

In some examples, the one or more contextual signals can comprise, or be generated based on, sensor data output by the sensor(s) 118. For example, the one or more contextual signals may comprise an acceleration obtained using an accelerometer, an orientation obtained using a gyroscope, a proximity obtained by a proximity sensor, a characteristic of a sound obtained by a microphone, an indication of an object or scene identified using a camera, an ambient light level obtained using an ambient light sensor, a pressure measured using a barometer, an altitude measured using an altimeter, data obtained using an NFC sensor, a temperature obtained using a temperature sensor, a humidity obtained using a humidity sensor, a heart rate (e.g. of the user) obtained using a heart rate sensor, fingerprint data obtained using a fingerprint sensor, magnetic field data obtained using a magnetometer, touch data obtained using a sensor, data obtained using a WiFi sensor, data obtained using a Bluetooth sensor, data obtained using a LiDAR sensor, and/or a blood oxygen saturation level (e.g., of the user) measured using a pulse oximeter. In some examples, one or more of the contextual signals may have been generated based on sensor data output by sensor(s) of another client device 119 communicatively coupled to the client device 110 and/or LLM output system 120.

Further, the client device 110 and/or the LLM output system 120 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers as indicated by 110B) and can be accessible by the client device 110 over one or more of the networks 199.

In some implementations, operations performed by the automated assistant 115 may be implemented locally at the client device 110 via the LLM output client 114. As shown in FIG. 1, the LLM output client 114 may include an automatic speech recognition (ASR) engine 130A1, a natural language understanding (NLU) engine 140A1, a large language model (LLM) engine 150A1, and a text-to-speech (TTS) engine 160A1. In some implementations, the operations performed by the automated assistant 115 may be distributed across multiple computer systems, such as when the LLM output system 120 is implemented remotely from the client device 110 as depicted in FIG. 1. In these implementations, the automated assistant 115 may additionally or alternatively utilize ASR engine 130A2, NLU engine 140A2, LLM engine 150A2, and TTS engine 160A2 of the LLM output system 120.

Each of these engines may be configured to perform one or more functions. For example, the ASR engine 130A1 and/or 130A2 can process, using ASR model(s) stored in machine learning (ML) model(s) database 115A (e.g., a recurrent neural network (RNN) model, a transformer model, and/or any other type of ML model capable of performing ASR), any streams of audio data that capture spoken utterance(s) as NL based input and that is generated by microphone(s) of the client device 110 to generate ASR output. Notably, in some implementations, the ASR model can be utilized to generate the ASR output as the audio data is generated (e.g., a streaming ASR model). Further, the NLU engine 140A1 and/or 140A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output, other NL based input (such as typed input), and/or a context to generate NLU output (e.g., determined by the context engine 113). Moreover, the automated assistant 115 can cause the NLU output to be processed to generate fulfillment output. For instance, the automated assistant 115 can transmit one or more structured requests to one or more first-party (1P) systems and/or one or more third-party (3P) systems, and receive fulfillment output from one or more of the 1P systems and/or 3P systems to generate the fulfillment output. The one or more structured requests can be generated based on, for example, the NLU output, and the fulfillment output can correspond to, for example, multimedia content, dialog content, and/or other content that is responsive to the NLU output.

Moreover, the TTS engine 160A1 and/or 160A2 can process, using TTS model(s) stored in the ML model(s) database 115A, dialog content (e.g., text formulated by the automated assistant 115 through utilization of an LLM) to generate synthesized speech audio data that includes computer-generated synthesized speech capturing the dialog content. In implementations where the TTS engine 160A1 and/or 160A2 is utilized to process the dialog content, the TTS engine 160A1 and/or 160A2 can generate the synthesized speech using one or more prosodic properties to reflect different personas. Notably, the ML model(s) stored in the ML model(s) database 115A can be on-device ML models that are stored locally at the client device 110 or shared ML models that are accessible to both the client device 110 and/or remote systems when the LLM output system 120 is not implemented locally at the client device 110.

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, one or more corresponding predicted values (e.g., probabilities, log likelihoods, and/or other values) for each of the plurality of phonemes, and/or other ASR output. In some versions of those implementations, the ASR engine 130A1 and/or 130A2 can select one or more of the speech hypotheses as recognized text that corresponds to the spoken utterance(s) (e.g., based on the corresponding predicted values for each of the speech hypotheses), such as when the ASR engine 130A1 and/or 130A2 utilizes an end-to-end ASR model. In other implementations, the ASR engine 130A1 and/or 130A2 can select one or more of the predicted phonemes (e.g., based on the corresponding predicted values for each of the predicted phonemes), and determine recognized text that corresponds to the spoken utterance(s) based on the one or more predicted phonemes that are selected, such as when the ASR engine 130A1 and/or 130A2 utilizes an ASR model that is not end-to-end. In these implementations, the ASR engine 130A1 and/or 130A2 can optionally employ additional mechanisms (e.g., a directed acyclic graph) to determine the recognized text that corresponds to the spoken utterance(s) based on the one or more predicted phonemes that are selected.

In various implementations, the NLU output can include, for example, annotated recognized text that includes one or more annotations of the recognized text for one or more (e.g., all) of the terms of the recognized text. For example, the NLU engine 140A1 and/or 140A2 may include a part of speech tagger (not depicted) configured to annotate terms with their grammatical roles. Additionally, or alternatively, the NLU engine 140A1 and/or 140A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 140A1 and/or 140A2 may include a coreference resolver (not depicted) configured to group, or "cluster," references to the same entity based on one or more contextual cues. For example, the coreference resolver may be utilized to resolve the term "them" to "buy theatre tickets" in the NL based input "buy them", based on "theatre tickets" being mentioned in a client device notification rendered immediately prior to receiving input "buy them". In some implementations, one or more components of the NLU engine 140A1 and/or 140A2 may rely on annotations from one or more other components of the NLU engine 140A1 and/or 140A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the automated assistant 115 can utilize an LLM (e.g., stored in the ML model(s) database 115A) in generating an LLM output that is responsive to a structured LLM query. For example, the NLU engine 140A1 and/or 140A2 can optionally be omitted, and the LLM engine 150A1 and/or 150A2 can be utilized to process the recognized text generated by the ASR engine 130A1 and/or 130A2, contextual signals obtained and/or generated by the context engine 113, and/or other data. Also, for example, in implementations where the NL based input is non-speech based (e.g., the NL based input is typed input), the ASR engine 130A1 and/or 130A2 and the NLU engine 140A1 and/or 140A2 can optionally be omitted, and the LLM engine 150A1 and/or 150A2 can be utilized to process contextual data obtained and/or generated by the context engine 113. Accordingly, it should be understood that the LLM engine 150A1 and/or 150A2 can be implemented independent of any output generated by various other engines depicted in FIG. 1 (e.g., independent of any ASR output generated using the ASR engine 130A1 and/or 130A2 and/or independent of any NLU output generated using the NLU engine 140A1 and/or 140A2).

As depicted in FIG. 1, the LLM output system 120 can include an LLM fine-tuning engine 170, a structured LLM query engine 181, a triggering engine 184, a context determination engine 185, and a settings modification engine 188. These various engines of the LLM output system 120 can include sub-engines. For example, the LLM fine-tuning engine 170 can include a training instances engine 171 and a fine-tuning engine 172. Although particular engines and sub-engines are depicted in FIG. 1, it should be understood that is for the sake of example and to illustrate aspects of techniques described herein, and is not meant to be limiting. For example, various engine and/or sub-engines can be added, combined, and/or omitted.

As described herein, the client device 110 and/or the LLM output system 120 can be utilized to determine whether the client device 110 or a user of the client device 110 is in a particular context and to modify one or more settings of the client device 110, such as one or more audio content playback settings for rendering audio content, responsive to the determination. The structured LLM query engine 181 can generate a structured LLM query that can be processed (e.g., by the LLM engine 150A1 and/or 150A2) to generate an LLM output that is responsive to the structured LLM query. The context determination engine 184 can determine, based on the LLM output, whether the client device 110 or a user of the client device 110 is in a particular context.

In some implementations, for example, the structured LLM query can be generated based on one or more contextual signals (e.g., received from the context engine 113) and a predefined context (e.g., predefined by a user of the client device 110 or a third party and retrieved from the client device data database 110A). The one or more contextual signals can be associated with a current context of a client device 110 or a user of the client device 110, while the predefined context can be a predefined context of the client device 110 or of the user of the client device 110. In these implementations, the structured LLM query can be processed to generate an LLM output that includes an indication of whether the client device 110 or the user of the client device 110 is in the predefined context, and the context determination engine 184 can determine whether the client device 110 is in the predefined context based on the indication included in the LLM output. The settings modification engine 188 may cause one or more settings of the client device 110 to be modified, thereby resulting in one or more modified settings of the client device 110. For example, the settings modification engine 188 may cause the one or more settings of the client device 110 to be modified responsive to the context determination engine 184 making a positive determination that the client device 110 is in the predefined context.

Additionally or alternatively, in some implementations, for example, the structured LLM query can be generated based on a description of a context, the context being of the client device 110 or a user of the client device 110. The description of the context may have been provided as part of an NL based input provided to the client device 110 by a user. In these implementations, the structured LLM query can be processed to generate an LLM output that includes an indication of one or more expected contextual signals that are indicative of the client device 110 or the user being in the context (i.e., the described context). Furthermore, the context determination engine 184 can determine whether the client device 110 or the user of the client device 110 is in the context based on processing the one or more expected contextual signals and one or more current contextual signals (e.g., received from the context engine 113) that are associated with at least one of the client device and the user of the client device. In these implementations, the settings modification engine 188 may cause the one or more settings of the client device 110 to be modified responsive to the context determination engine 184 making a positive determination that the client device 110 or the user of the client device 110 is in the context that was described in the NL based input.

In various implementations, the LLM output system 120 can generate the structured LLM query independent of any explicit user input such as explicit user input to generate the structured LLM query or explicit user input to initiate rendering of audio content. One or more aspects of the LLM output system 120 and/or client device 110 are described in more detail herein (e.g., with respect to FIGS. 2, 3, 4, 5, 6A, 6B and 6C).

In various implementations, the client device 110 and/or the LLM output system 120 may be in communication with a media content database 182A in which media content such as audio content is stored. Media content to be rendered by the client device 110 (e.g., using the rendering engine 112) can be retrieved from the media content database 182A by the client device 110 and/or the LLM output system 120.

It should be understood that the media content described herein can include any type of content that uses one or more text, images, audio, and/or video to convey information to a user for one or more purposes. As some non-limiting examples, the media content can be for entertainment purposes, such as songs, music videos, trivia, podcasts, animations, sports news, world news, local news, and/or other media content that can be provided for entertainment purposes; education purposes, such as lectures, presentations, webinars, and/or other media content that can be provided for education purposes; and/or for other purposes. It should also be understood that the audio content described here can include any type of media content that comprises audio data that is to be audibly rendered. As some non-limiting examples, the audio content can be songs, music videos, trivia (if containing audio data that is to be audibly rendered), podcasts, animations (if containing audio data that is to be audibly rendered), sports news (if containing audio data that is to be audibly rendered), world news (if containing audio data that is to be audibly rendered), local news (if containing audio data that is to be audibly rendered), lectures (if containing audio data that is to be audibly rendered), presentations (if containing audio data that is to be audibly rendered), webinars (if containing audio data that is to be audibly rendered), videos (if containing audio data that is to be audibly rendered), and/or other media content that can be audibly rendered.

Prior to a structured LLM query being processed using the structured LLM query engine 181, the LLM fine-tuning engine 170 can fine-tune an LLM (e.g., stored in the ML model(s) database 115A) based on a plurality of training instances. By fine-tuning the LLM based on the plurality of training instances, the LLM is effectively trained to generate an LLM output that includes the indication of whether the client device 110 or user is in a predefined context and/or generate an LLM output that includes the one or more expected contextual signals that are indicative of the client device 110 or the user being in a given context.

For example, the LLM fine-tuning engine 170 can identify an LLM (e.g., stored in the ML model(s) database 115A) that is to be fine-tuned. The LLM that is identified can include, for example, any LLM that is stored in the LLM(s) database 115A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory. Notably, the LLM can include billions of weights and/or parameters that are learned through training the LLM on enormous amounts of diverse data. This enables the LLM (e.g., prior to fine-tuning) to generate the LLM output as the probability distribution over a sequence of tokens and based on processing NL based input, contextual signal(s), and/or other data.

Further, the training instances engine 171 can obtain (e.g., from training instance(s) database 171A) and/or generate a plurality of training instances. In implementations where the LLM is to be used to generate an LLM output that includes at least an indication of whether the client device 110 is in a predefined context, each of the training instances can include a corresponding structured LLM query, and an indication of whether a client device 110 or user of the client device 110 is in a predefined context, the indication being associated with the corresponding structured LLM query. For instance, a given training instance, of the plurality of training instances, can include one or more contextual signals associated with a context of a client device 110 or a user of the client device 110, a predefined context of the client device 110 or the user of the client device 110, and an indication of whether the client device 110 or the user is in the predefined context (i.e., based on the one or more contextual signals). As a specific example, a given training instance, of the plurality of training instances, can include a first contextual signal comprising a location of the client device 110 (e.g., location coordinates corresponding to the location of a church), a second contextual signal comprising an ambient noise level (e.g., indicating a 'low' ambient noise level of 30 decibels), a predefined context of 'client device is in a church', and an indication that the client device 110 is in the predefined context (i.e., an indication that the client device 110 is indeed in the church). As another specific example, a given training instance, of the plurality of training instances, can include a first contextual signal comprising a velocity of the client device 110 (e.g., indicating that the client device 110 is stationary), a second contextual signal comprising a heart rate of the user of the client device 110 (e.g., indicating a 'low' heart rate of 45 beats per minute, bpm, indicative of the user sleeping), a predefined context of 'user is asleep', and an indication that the client device 110 is in the predefined context (i.e., an indication that the user is indeed asleep). As another specific example, a given training instance, of the plurality of training instances, can include a first contextual signal comprising a calendar entry (e.g., indicating that the user is at a concert), a second contextual signal comprising a heart rate of the user of the client device 110 (e.g., indicating a relatively 'high' heart rate of 95 bpm indicative of the user not being asleep), a predefined context of 'user is at home and asleep', and an indication that the client device 110 or user is not in the predefined context (i.e., an indication that the user is not at home and asleep). These specific examples are non-limiting and it should be understood that different given training instances to those outlined above can be used instead or in addition.

In implementations where the LLM is to be used to generate an LLM output that includes an indication of one or more expected contextual signals that are indicative of the client device 110 or the user being in a given context, each of the training instances can include a corresponding structured LLM query, and an indication of one or more expected contextual signals that are indicative of the client device 110 or the user being in the given context, the indication being associated with the corresponding structured LLM query. For instance, a given training instance, of the plurality of training instances, can include a natural language description of a context, and corresponding one or more expected contextual signals that are indicative of the client device 110 or the user being in the context. As a specific example, a given training instance, of the plurality of training instances, can include a description of a context that is 'user is on a flight', and corresponding expected contextual signals of 'altimeter of client device indicates altitude greater than 6000 m' and 'client device has a velocity greater than 500 km/h'. As another specific example, a given training instance, of the plurality of training instances, can include a description of a context that is 'user is playing football at the weekend', and corresponding expected contextual signals of 'user heart rate is greater than 140 beats per minute', 'day is Saturday or Sunday', and 'ambient noise levels are greater than 60 decibels'. These specific examples are non-limiting and it should be understood that different given training instances to those outlined above can be used instead or in addition.

The fine-tuning engine 172 can cause the identified LLM to be fine-tuned based on the plurality of training instances to generate a fine-tuned LLM, and can cause the fine-tuned LLM to be stored in the ML model(s) database 115A. In some instances, the same LLM can be fine-tuned to generate an LLM output that includes an indication of whether the client device 110 or the user is in the predefined context (e.g., as described in relation to method 300 of FIG. 3) and also be fine-tuned to generate an LLM output that includes an indication of one or more expected contextual signals that are indicative of the client device 110 or the user being in the context (e.g., as described in relation to method 400 of FIG. 4). However, in other instances, one LLM may be fine-tuned to generate the LLM output that includes an indication of whether the client device 110 or the user is in the predefined context while another, different LLM may be fine-tuned to generate an LLM output that includes an indication of one or more expected contextual signals that are indicative of the client device 110 or the user being in the context.

Although FIG. 1 is described with respect to a single client device 110 having a single user, it should be understood that is for the sake of example and is not meant to be limiting. For example, one or more additional client devices of a user or other users (e.g., client device(s) 191) can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., in a household environment, in an enterprise or work environment, in a hospitality environment, etc.). One or more contextual signals as used herein may, in some examples, be received from one or more of the client devices 191 and/or be generated based on sensor data received from one or more of the client devices 191.

Furthermore, while various databases are depicted in FIG. 1 as being located external to the client device 110 and/or LLM output system 120, this depiction is meant to be non-limiting. For example, in some instances, one or more of the databases may be comprised in one or more of the client device 110 and/or the LLM output system 120.

Figure 2:
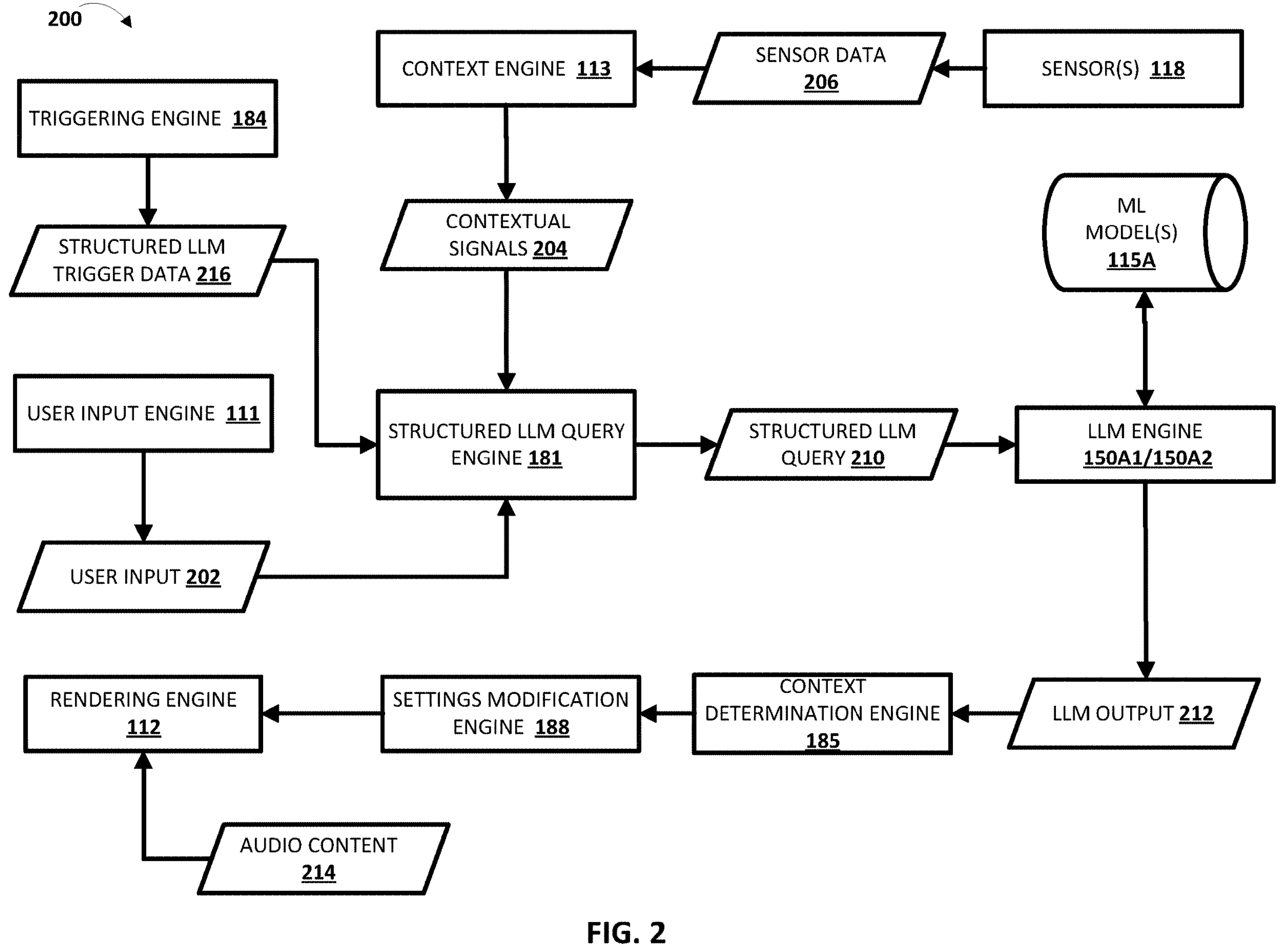
FIG. 2 depicts an example process flow of utilizing a large language model (LLM) for modifying one or more settings of a client device, in accordance with various implementations.

Turning now to FIG. 2, an example process flow 200 of utilizing a large language model (LLM) to determine whether a client device (e.g., the client device 110 of FIG. 1) or a user of the client device is in a predefined context, and to determine whether to modify one or more settings of the client device is depicted.

For the sake of example, assume that the triggering engine 184 determines to generate a structured LLM query for determining whether the client device 110 or a user of the client device 110 is in a particular context. The triggering engine 184 can generate structured LLM trigger data 216 that initiates generation of a structured LLM query. For instance, and as shown in FIG. 2, the triggering engine 184 can provide the structured LLM trigger data 216 to the structured LLM query engine 181, and the structured LLM query engine 181 can cause the context engine 113 to provide one or more contextual signals 204 to the structured LLM query engine 181 for generating the structured LLM query. Additionally, or alternatively, the triggering engine 184 can provide the structured LLM trigger data 216 directly to the context engine 113 to cause the context engine 113 to provide one or more contextual signals 204 to the structured LLM query engine 181.

The triggering engine 184 can determine to generate a structured LLM query based on various signals. In some implementations, the triggering engine 184 can determine to generate the structured LLM query based on one or more of a software application capable of rendering audio content being launched, user input directed to initiate rendering of the audio content (or other media content) being received (e.g., user input directed to the software application to initiate rendering of the audio content (or other media content)), and/or receipt of an indication that the software application will auto-play (automatically render) the audio content (or other media content) (e.g., without the software application first receiving explicit user input to initiate rendering of the audio content (or other media content)). In some versions of those implementations, the software application can be a first-party software application, whereas in other versions of those implementations, the software application can be a third-party application. As used herein, the term "first-party" is associated with a first-party entity that manages and/or hosts the LLM output system 120, whereas the term "third-party" is associated with a third-party entity that is a distinct entity from the first-party entity that manages and/or hosts the LLM output system 120. Accordingly, in versions of those implementations where the software application is a third-party software application, the first-party entity can provide the LLM output system 120 as a service to the third-party.

In additional or alternative implementations, the triggering engine 184 can determine to generate the structured LLM query based on a schedule. For example, in accordance with the schedule, the triggering engine 184 can determine to generate the structured LLM query at predetermined time intervals, for example at intervals of one second, intervals of ten seconds, intervals of thirty seconds, intervals of one minute, or intervals of five minutes. It should be noted that these intervals are provided by way of example only, and that other intervals may be used instead.

In additional or alternative implementations, the triggering engine 184 can determine to generate the structured LLM query based on one or more contextual signals. For example, the triggering engine 184 can determine to generate the structured LLM query responsive to determining that one or more new contextual signals have been generated or obtained (e.g., by the context engine 113). Additionally, or alternatively, the triggering engine 184 can determine to generate the structured LLM query responsive to determining that one or more contextual signals have been modified, in some examples by more than a threshold amount. As an example, the triggering engine 184 can determine to generate a structured LLM query based on receipt of a new contextual signal that indicates that the client device 110 and/or user has moved to a new location.

In additional or alternative implementations, the triggering engine 184 can determine to generate the structured LLM query based on the client device completing rendering of previous audio content.

As noted above, and in response to the triggering engine 184 determining to generate the structured LLM query, the context engine 113 can provide the contextual signals(s) 204 to the structured LLM query engine 181, and the structured LLM query engine 181 can generate a structured LLM query 210 based on at least the contextual signal(s) 204. The contextual signals 204 can include, for example, contextual signals associated with the user of the client device 110 and/or contextual signals 204 associated with the client device 110 itself. The contextual signals may comprise any suitable contextual signals described herein.

Further, the structured LLM query engine 181 can provide the structured LLM query 210 to the LLM engine 150A1 and/or 150A2. The LLM engine 150A1 and/or 150A2 can process, using an LLM stored in the ML model(s) database 115A (e.g., the LLM that is fine-tuned as described above with respect to FIG. 1), the structured LLM query 210 to generate an LLM output 212. In implementations where the structured LLM query 210 has been generated based on the one or more contextual signals and a predefined context of the client device or the user of the client device, the LLM output 212 can include, for example, an indication of whether the client device 110 or the user of the client device 110 is in the predefined context. Accordingly, the context determination engine 184 can utilize the LLM output 210, for example by processing the indication included in the LLM output 210, to determine whether the client device 110 or the user of the client device 110 is in the predefined context.

In some examples, the context determination engine 185 can utilize further data in addition to the LLM output 210 to determine whether the client device 110 or the user of the client device 110 is in the predefined context. For example, the context determination engine 185 could receive one or more current contextual signals (e.g., contextual signals 204) from the context engine 113 and/or one or more user inputs (e.g., user input 202) from the user input engine 111 and determine whether the client device 110 or the user of the client device 110 is in the predefined context based on those received one or more contextual signals and/or one or more user inputs 202, in addition to the LLM output 210. By utilizing further data such as contextual signals and user inputs in addition to the LLM output 210, the context determination engine 185 may be able to determine whether the client device 110 or the user of the client device 110 is in the predefined context with greater accuracy. For example, in a scenario in which the LLM has hallucinated and has generated an LLM output 210 that incorrectly indicates whether the client device 110 or the user of the client device 110 is in the predefined context, the context determination engine 185 may utilize one or more contextual signals and/or user inputs to validate and possibly overrule the indication provided in the LLM output 210. In some examples, the context determination engine 185 may utilize one or more appropriate ML models (e.g., stored in the ML model(s) database 115A) and/or heuristics in its determinations, wherein the one or more appropriate ML models may be trained and fine-tuned using the contextual signals, user inputs and/or LLM outputs.

Responsive to determining that the client device 110 or the user of the client device 110 is in the predefined context, the context determination engine 184 can transmit a signal to the settings modification engine 188 to cause the settings modification engine 188 to modify one or more settings of the client device, for example one or more audio content playback settings for rendering audio content. The one or more modified settings of the client device can then be used (e.g., by the rendering engine 112) for subsequently rendering audio content 214 at the client device. The audio content 214 may have been obtained from the media content database(s) 182A for rendering by the rendering engine 112, or it may have been obtained by streaming the audio data 214 via a communication session with an audio content streaming service provider (e.g., a first-party music streaming service provider or a third-party music streaming service provider). However, other sources of the audio content 214 and/or mechanisms for acquiring the audio content 214 for rendering are envisaged.

Although the process flow 200 of FIG. 2 has generally been described in relation to generating the structured LLM based on one or more contextual signals, in additional or alternative implementations, the structured LLM query engine 181 may instead (or additionally) generate a structured LLM query 210 based on at least a description of a context, the context being of the client device or of the user of the client device. The description of the context may have been received as part of an NL based input provided by the user, for example detected via the user input engine 111 and indicated by the user input 202. In these implementations, the structured LLM query engine 181 can provide the structured LLM query 210 to the LLM engine 150A1 and/or 150A2. Furthermore, the LLM engine 150A1 and/or 150A2 can process, using an LLM stored in the ML model(s) database 115A (e.g., the LLM that is fine-tuned as described above with respect to FIG. 1), the structured LLM query 210 to generate an LLM output 212, wherein the LLM output includes an indication of one or more expected contextual signals. The one or more expected contextual signals are theoretical contextual signals that would be indicative of the client device or the user being in the context (i.e., the context on which generation of the structured LLM query was based). Put another way, the one or more expected contextual signals are contextual signals that, if current contextual signals associated with the client device 110 and/or user matched the expected contextual signals, the current contextual signals would be indicative of the client device or user being in the context described in the NL based input.

Accordingly, the context determination engine 184 can utilize one or more expected contextual signals and one or more current contextual signals associated with at least one of the client device and the user of the client device to determine whether the client device or the user of the client device is in the context (i.e., the context on which generation of the structured LLM query was based). The current contextual signals may have been provided to the context determination engine 184 by the context engine 113 and may include any of the examples of contextual signals described herein. Responsive to a determination by the context determination engine 184 that the client device or the user of the client device is in the context, the context determination engine 185 may transmit data to the settings modification engine 188 such that the settings modification engine 188 causes one or more settings of the client device to be modified. Where the one or more settings comprise one or more audio content playback settings for rendering audio content, the one or more modified settings of the client device can then be used (e.g., by the rendering engine 112) for subsequently rendering audio content 214 at the client device.

Although the process flow 200 of FIG. 2 is depicted as including a particular flow, it should be understood that is for the sake of example to illustrate various aspects of the LLM output system 120 and is not meant to be limiting.

Figure 3:
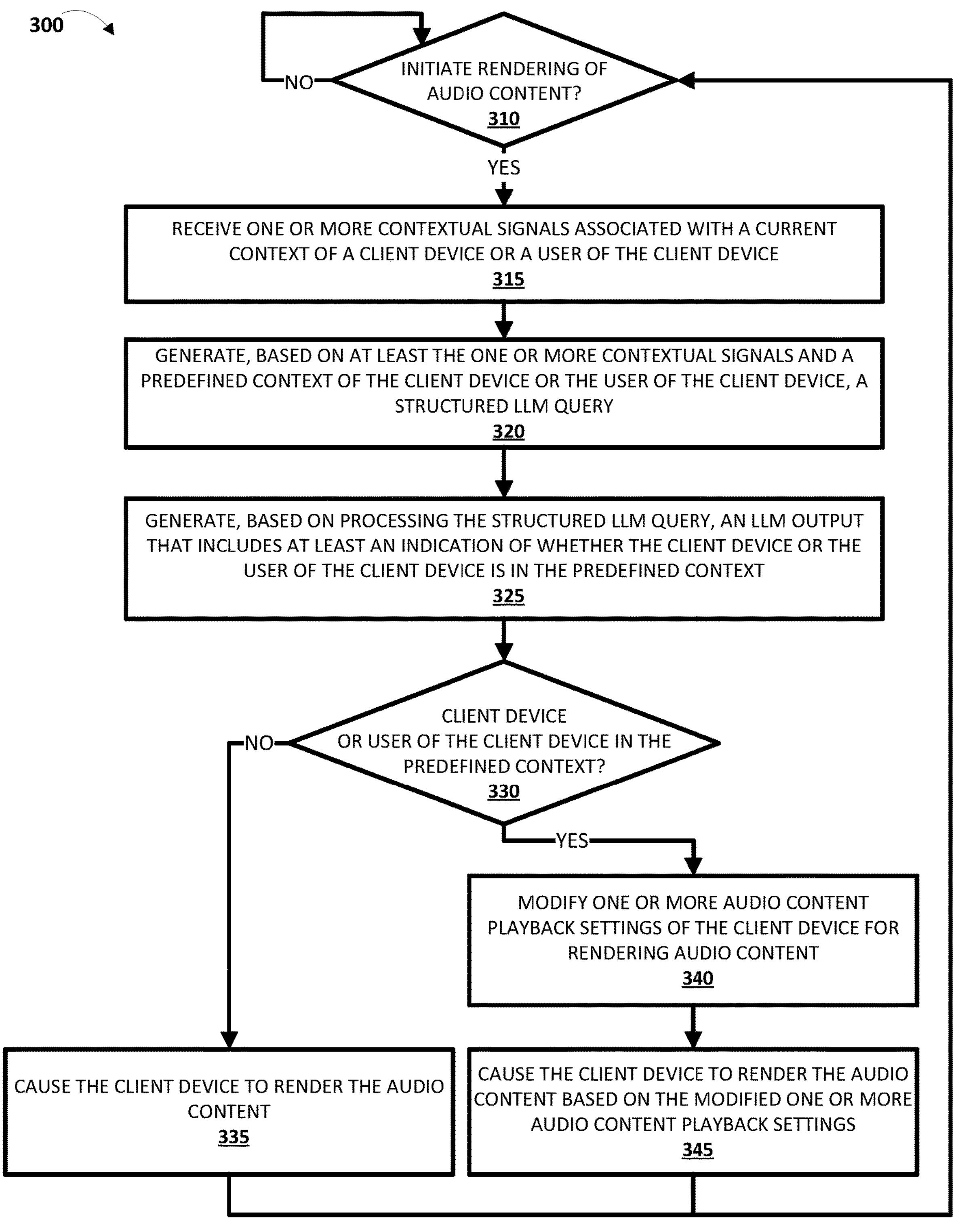
FIG. 3 depicts a flowchart illustrating an example method of utilizing an LLM in determining whether a client device or a user is in a predefined context, in accordance with various implementations.

Turning now to FIG. 3, a flowchart illustrating an example method 300 of determining whether to modify one or more audio content playback settings of a client device is depicted. For convenience, the operations of the method 300 are described with reference to a system that performs the operations. This system of the method 300 includes one or more processors, memory, and/or other component(s) of computing device(s) (e.g., client device 110 of FIG. 1, LLM output system 120 of FIG. 1, client device 610 of FIG. 6A, 6B or 6C, computing device 710 of FIG. 7, one or more servers, and/or other computing devices). Moreover, while operations of the method 300 are shown in a particular order, this is not meant to be limiting. One or more operations may be reordered, omitted, and/or added.

At block 310, the system determines whether to initiate rendering of audio content at a client device (e.g., client device 110 of FIG. 1). The system can determine whether to initiate the rendering of the audio content at the client device based on, for example, receiving a user input to initiate rendering of audio content at the client device. For instance, the user input can be based on the user accessing a software application (e.g., a first-party software application or a third-party software application) that is capable of rendering audio content, directing user input to the software application to initiate the rendering of the audio content after the software application has already been accessed, providing a voice command to initiate the rendering of the audio content, and/or received in other manners. If, at an iteration of block 310, the system determines not to initiate the rendering of the audio content at the client device, then the system can continue monitoring for whether to initiate the rendering of the multimedia content at the client device at block 310. If, at an iteration of block 310, the system determines to initiate the rendering of the audio content at the client device, then the system can proceed to block 315.

At block 315, the system receives one or more contextual signals associated with a current context. The current context may be a current context of the client device or a current context of a user of the client device. For example, the system can obtain and/or generate one or more contextual signals that are associated with the user of the client device, or that are associated with the client device itself.

At block 320, the system generates, based on at least the one or more contextual signals and a predefined context, a structured LLM query. The predefined context may be a predefined context of the client device or of the user of the client device. Furthermore, the predefined context may have been defined by a user of the client device, or by a third party, for example. Based on the one or more contextual signals received at block 315, the system can generate the structured LLM query by transforming the one or more contextual signals and the predefined context into a structured format that can be processed by an LLM (e.g., the LLM that is fine-tuned as described above with respect to FIG. 1) to generate an LLM output that includes an indication of whether the client device or the user of the client device is in the predefined context.

At block 325, the system generates, based on processing the structured LLM query, an LLM output that includes an indication of whether the client device or the user of the client device is in the predefined context. For example, the system can process, using the LLM, the structured LLM query to generate an LLM output that includes the indication of whether the client device or the user of the client device is in the predefined context (e.g., as described with respect to the structured LLM query engine 181 in the process flow 200 of FIG. 2).

At block 330, the system determines, based on at least the indication included in the LLM output, whether the client device or the user of the client device is in the predefined context. For instance, the system processes the indication generated at block 325 to determine whether the client device or the user of the client device is in the predefined context. If, at an iteration of block 330, the system determines that the client device or the user of the client device is not in the predefined context, then the system can proceed to block 335. If, at an iteration of block 330, the system determines that the client device or the user of the client device is in the predefined context, then the system can proceed to block 340.

At block 335, and responsive to a determination at block 330 that that the client device or the user of the client device is not in the predefined context, the system may cause the client device to initiate rendering the audio content. The system may cause the client device to initiate rendering the audio content without having first modified one or more audio content playback settings of the client device.

On the other hand, at block 340, and responsive to a determination at block 330 that that the client device is in the predefined context, the system modifies one or more audio content playback settings of the client device. In some examples, modifying the one or more audio content playback settings of the client device may comprise causing a playback volume for rendering the audio content to be reduced. For example, the playback volume may be decreased to a predetermined level, or the current playback volume may be decreased a predetermined magnitude or by a predetermined percentage.

In examples where modifying the one or more audio content playback settings of the client device comprises causing a playback volume for rendering the audio content to be reduced, modifying the one or more audio content playback settings of the client device may, in some instances, further comprise causing the playback volume to be ramped up after being reduced. The playback volume is caused to be ramped up after rendering of the audio has been initiated. As such, the audio content will initially be rendered at a reduced playback volume and, subsequently, with the playback volume will be gradually increased. In some examples, a rate at which the playback volume is ramped up may be selected by the system based on the predefined context. That is, in some examples, more than one context may have been predefined, with each predefined context having a different associated rate at which the playback volume is to be ramped up. The system may therefore select the rate that corresponds to the particular predefined context which the system has determined the client device or user to be in.

Additionally or alternatively, in some examples, modifying the one or more audio content playback settings of the client device may comprise inhibiting rendering of the audio content and/or causing a notification to be visually rendered at the client device prior to rendering the audio content. As such, the audio content may be prevented from being rendered without the user first being provided with a notification. The notification may indicate to the user that it may be undesirable to render the audio content at the present moment in time (for example, because the client device is in an unsuitable context for rendering audio content, such as being at an unsuitable location).

After block 340, the system proceeds to block 345, at which the system causes the client device to initiate rendering the audio content based on (i.e., in accordance with) the modified one or more media content playback settings. For example, where modifying the one or more audio content playback settings of the client device comprised causing a playback volume for rendering the audio content to be reduced, the system causes the client device to initiate rendering the audio content at the reduced playback volume (wherein the reduced playback volume is a lower playback volume than if the one or more audio content playback settings were not modified, for example because the system proceeded from block 330 to block 334).

In examples where modifying the one or more audio content playback settings of the client device comprises inhibiting rendering of the audio content (and, optionally, causing a notification to be visually rendered at the client device prior to rendering the audio content), the system may not automatically proceed from block 340 to block 345. Rather, the system may wait to receive an indication of a user input to initiate rendering of the audio content at the client device before moving from block 340 to block 345, thereby providing the user with an opportunity to confirm whether they wish for the audio content to be rendered, prior to the audio content being rendered. Responsive to receiving the indication of the user input (e.g., via the user input engine 111 of FIG. 1), the system may cause the client device to initiate rendering of the audio content. Alternatively, the system may terminate method 300, or may skip block 345.

In some implementations, for example as shown in FIG. 3, the system may return to block 310 after block 335 and/or block 345, where, at block 310, it is determined whether to initiate rendering of subsequent audio content at the client device. The subsequent audio content may be different audio content to the audio content rendered at block 335 or block 345 (e.g., the subsequent audio content may comprise a different song to the subsequent content rendered at block 335 or block 345), or it may be the same audio content (e.g., the subsequent audio content corresponds to the same song as the audio content rendered at block 335 or block 345). In these implementations, the system may wait until rendering of the audio content has finished or has been terminated before moving from block 335 or block 345 to block 310, to prevent the playback volume being further adjusted during rendering of the audio content. In some other implementations, the method 300 may terminate after block 335 or block 345.

Although the method 300 is depicted as including particular operations in a particular order, it should be understood that is for the sake of example and is not meant to be limiting. For example, in some implementations block 310 is instead performed between block 330 and block 335 and/or between block 340 and block 345. In these implementations, blocks 315, 320, 325, 330 and optionally block 340 may therefore be performed without first performing block 310, that is, without first determining whether to initiate rendering of audio content at the client device. As such, it may be possible to modify the one or more audio content playback settings of the client device before an indication to initiate rendering of the audio content has been received. This may be beneficial in that it may reduce a latency between receiving an indication to initiate rendering of the audio content and actually causing the audio content to be rendered, since blocks 315, 320, 325, 330 and 340 will have been performed prior to receiving the indication to initiate rendering. In these or other implementations, the system may continuously perform iterations of blocks 315, 320, 325, 330 and optionally block 340 as a background process while waiting to receive the indication to initiate rendering of the audio content. As such, the system can dynamically and continuously determine whether the client device or the user of the client device is in the predefined context and modify the audio content playback settings as appropriate. This may allow the system to dynamically modify the audio content playback settings as a current context of the client device and/or user of the client device changes over time (e.g., as the client device moves between different locations with different environmental characteristics).

While it has been generally described that the system determines at block 310 whether to initiate the rendering of the audio content based on receiving a user input to initiate rendering of audio content at the client device, it should be understood that this is not meant to be limiting, and that the determination at block 310 may be made based on one or more inputs other than user inputs. For example, where a software application of the client device is arranged to auto-play the audio content without first receiving a user input to initiate rendering of the audio content, the system may determine at block 310 to initiate the rendering of the audio content based on a signal from the software application indicating that rendering of the audio content is to be initiated.

Additional operations not depicted in the method 300 may additionally or alternatively be included. For example, in some implementations, one or more audio content playback settings of the client device may be modified following a determination at block 330 that the client device or the user of the client device is not in the predefined context and prior to causing the client device to render the audio content at block 335. In these implementations, the one or more audio content playback setting may be modified in a different manner to the modification performed at block 340. For example, a playback volume for rendering the audio content may be increased rather than reduced, for example to a predetermined 'normal' playback volume. This may be beneficial in instances where the system is continuously performing iterations of blocks 315, 320, 325, 330 and optionally block 340 as a background process while waiting to receive the indication to initiate rendering of the audio content, since it can allow for the one or more audio content playback settings to be continuously modified as the client device or user moves in and out of predefined contexts.

In some examples, the method 300 may further comprise receiving one or more confidence indicators (e.g., from the context engine 113), wherein each confidence indicator of the one or more confidence indicators corresponds to a respective contextual signal of the one or more contextual signals processed at block 320 and is indicative of a confidence in the respective contextual signal (i.e., a confidence in the contextual signal being accurate or true). For example, a contextual signal comprising a location of a client device that has been generated using a location sensor (e.g., using GPS) will likely have a high degree of accuracy (i.e., it is highly certain that the client device is indeed at the location specified in the contextual signal), and so may have a corresponding confidence indicator that is indicative of a relatively high confidence in that contextual signal being accurate. On the other hand, a contextual signal comprising a calendar entry that indicates that a user is at a concert will likely have a lower degree of accuracy, since it is possible that the user may not actually be at the concert (for example, the user may have changed their plans and not updated the calendar entry). As such, the contextual signal comprising the calendar entry may have a corresponding confidence indicator that is indicative of a relatively low confidence in that contextual signal being accurate. It may therefore be preferable to give greater weight to contextual signals having corresponding confidence indicators indicative of a relatively higher confidence than to contextual signals having corresponding confidence indicators indicative of a relatively lower confidence, since this may result in improved accuracy in the determination of whether a client device or user is in a particular context. In such examples, generating the structured LLM query at block 320 will be further based on the one or more confidence indicators such that, when the resulting structured LLM query is processed at block 325 using the LLM, the LLM will be able to take into account the confidence indicators for each contextual signal and therefore feasibly provide in the LLM output a more reliable indication of whether the client device or the user is in the predefined context. The confidence indicators could, for example, be scores.

Figure 4:
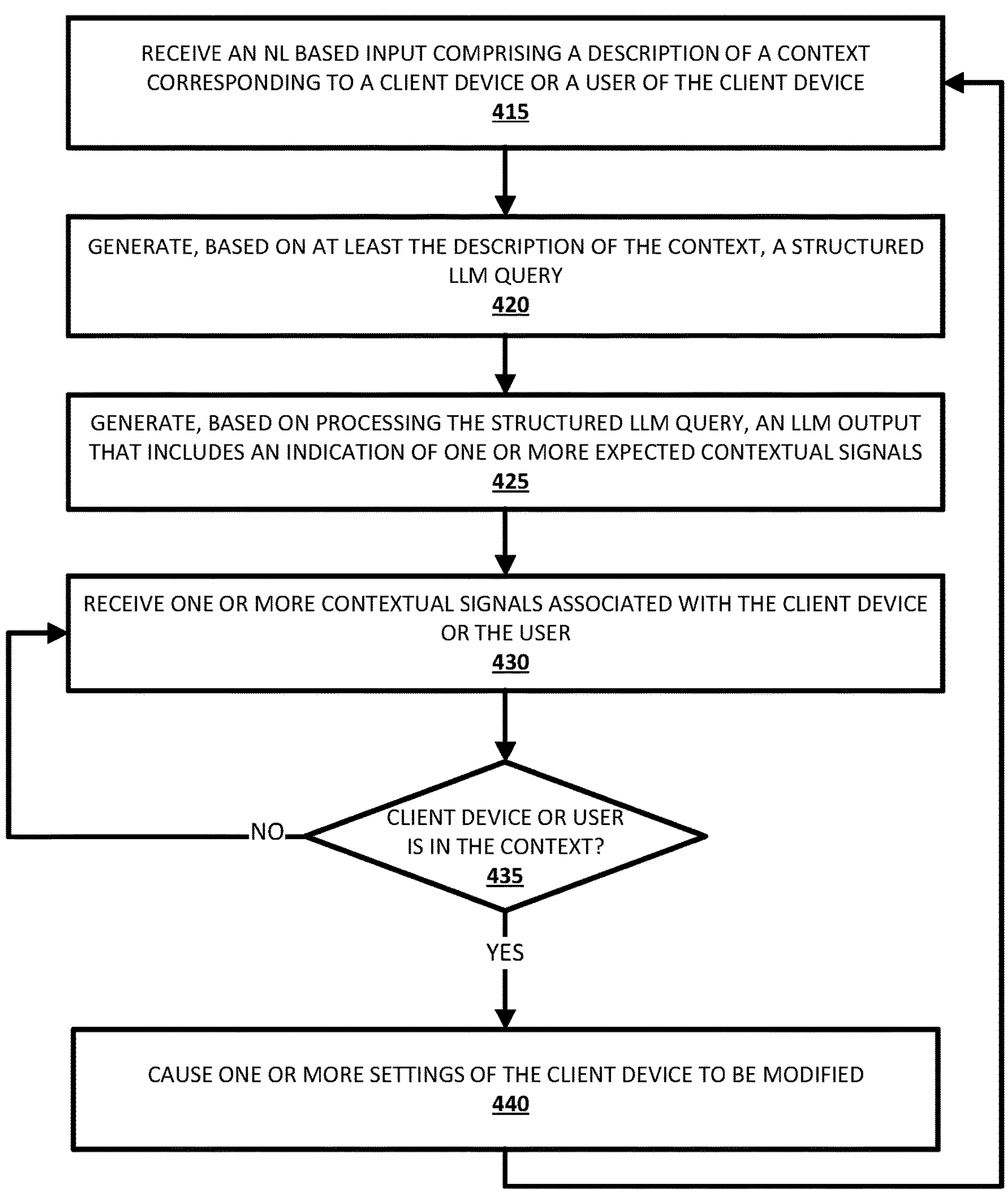
FIG. 4 depicts a flowchart illustrating an example method of utilizing an LLM in determining whether a client device or a user is in a predefined context, in accordance with various implementations.

Turning now to FIG. 4, a flowchart illustrating an example method 400 of determining when to modify one or more settings of a client device is depicted. For convenience, the operations of the method 400 are described with reference to a system that performs the operations. This system of the method 400 includes one or more processors, memory, and/or other component(s) of computing device(s) (e.g., client device 110 of FIG. 1, LLM output system 120 of FIG. 1, client device 610 of FIG. 6A, 6B or 6C, computing device 710 of FIG. 7, one or more servers, and/or other computing devices). Moreover, while operations of the method 400 are shown in a particular order, this is not meant to be limiting. One or more operations may be reordered, omitted, and/or added.

At block 415, the system receives an NL based input, for example via the user input engine 111. The NL based input comprises a (natural language) description of a context corresponding to the client device or a user of the client device. Before providing the NL based input, the context may not have been previously defined by the user.

At block 420, the system generates, based on at least the description of the context obtained at block 415, a structured LLM query (e.g., as described in relation to the structured LLM query engine 181 of FIG. 1 and FIG. 2). Based on the description of the context received at block 415, the system can generate the structured LLM query by transforming the description of the context into a structured format that can be processed by an LLM (e.g., the LLM that is fine-tuned as described above with respect to FIG. 1).

At block 425, the system generates (e.g., as described in relation to the LLM engine 150A1/150A2 of FIG. 1 and FIG. 2), based on processing the structured LLM query generated at block 420, an LLM output that includes an indication of one or more expected contextual signals that are indicative of the client device or the user being in the context. For example, the system can process, using the LLM, the structured LLM query to generate an LLM output that includes the indication of the one or more expected contextual signals (e.g., as described with respect to the process flow of FIG. 2). The one or more expected contextual signals are contextual signals that, if matched by corresponding contextual signals of the client device, would be indicative of the client device being in the context described in the NL based input.

At block 425, the system receives one or more contextual signals associated with the client device. For example, the system (e.g., the context engine 113) can obtain and/or generate contextual signals that are associated with the user of the client device or the client device itself. The one or more contextual signals may be current contextual signals, in that they are associated with a current state of the client device or user of the clint device.

At block 435, the system determines, based on the one or more contextual signals received at block 430 and the indicated one or more expected contextual signals generated at block 425, whether the client device is in the context described in the NL based input. For instance, the system may perform a comparison between the one or more contextual signals received at block 430 and the indicated one or more expected contextual signals generated at block 425 and determine whether the client device is in the context described in the NL based input based on a result of the comparison. The one or more current contextual signals used at block 435 may have been selected by the system based on the one or more expected contextual signals. That is, the system may have selected to use in the determination at block 435 only current contextual signals that correspond to the expected contextual signals (e.g., the current contextual signals are of the same type as the expected contextual signals and/or have been generated using the same type of sensor(s)). If, at an iteration of block 435, the system determines that the client device is in the predefined context, then the system can proceed to block 440. At block 440, and responsive to determining that the client device is in the context, the system causes one or more settings of the client device to be modified. The one or more settings of the client device to be modified may have been predefined, for example by the user of the client device or a third party. For example, the user may have previously defined which one or more settings of the client device should be modified and in what manner. In some examples, such an indication may have been provided in the NL based input in addition to the description of the context.

In some implementations, after block 440, the system may then return to block 415 to monitor for receipt of a new NL based input. In some implementations (not depicted in FIG. 4) the system may instead return to block 430 (without first returning to block 415), to monitor for receipt of one or more new contextual signals.

If, at an iteration of block 435, the system determines that the client device is not in the predefined context, then the system can return to block 430 to continue monitoring for new contextual signals, without causing the one or more settings to be modified at block 440.

Although the method 400 is depicted as including particular operations in a particular order, it should be understood that is for the sake of example and is not meant to be limiting. Further, additional operations not depicted in the method 400 may additionally or alternatively be included.

Figure 5:
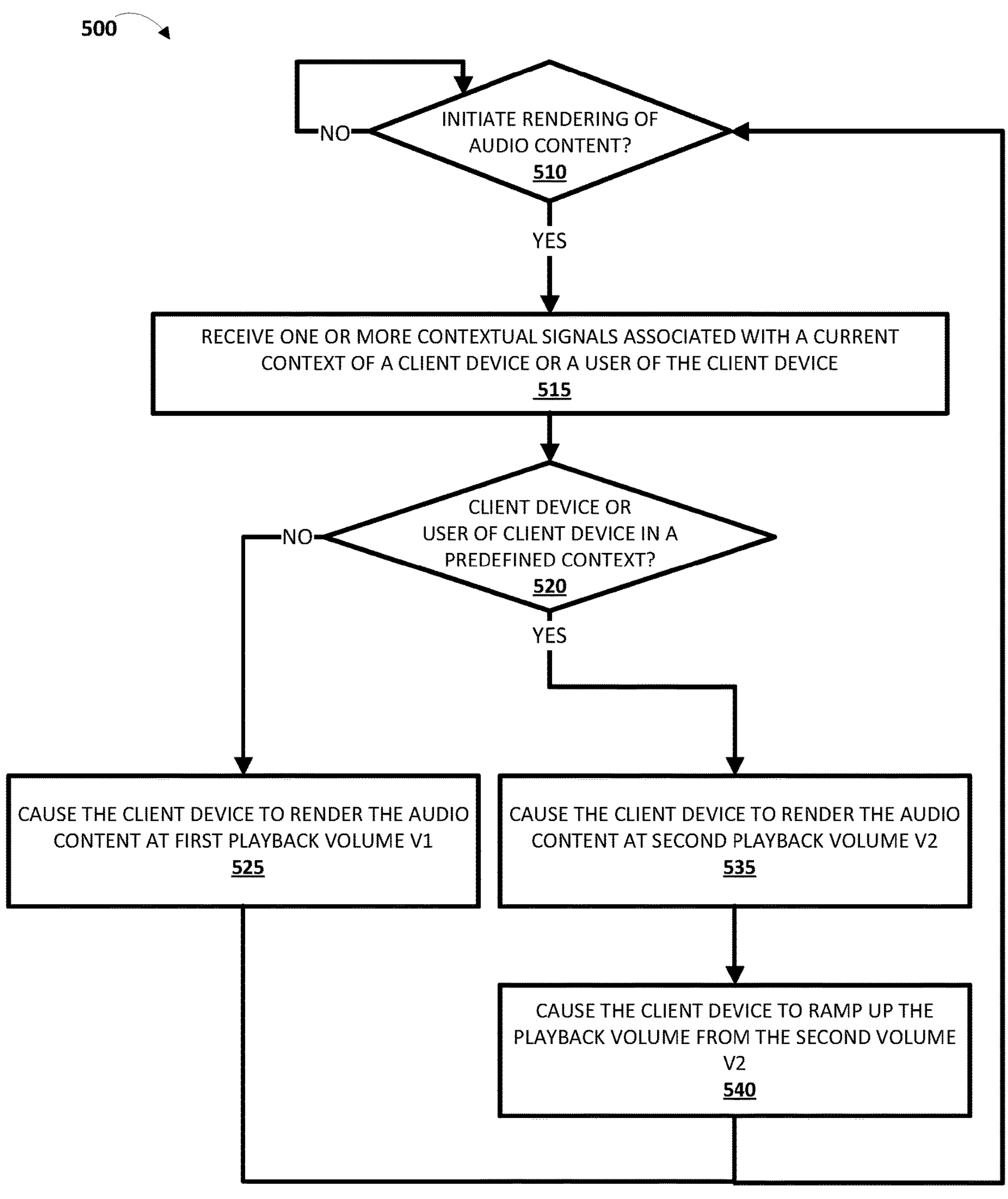
FIG. 5 depicts a flowchart illustrating an example method of determining whether a client device or a user is in a predefined context, in accordance with various implementations.

Turning now to FIG. 5, a flowchart illustrating an example method 500 of determining when to modify one or more audio content playback settings of a client device is depicted. For convenience, the operations of the method 500 are described with reference to a system that performs the operations. This system of the method 500 includes one or more processors, memory, and/or other component(s) of computing device(s) (e.g., client device 110 of FIG. 1, LLM output system 120 of FIG. 1, client device 610 of FIG. 6A, 6B or 6C, computing device 710 of FIG. 7, one or more servers, and/or other computing devices). Moreover, while operations of the method 500 are shown in a particular order, this is not meant to be limiting. One or more operations may be reordered, omitted, and/or added.

At block 510, the system determines whether to initiate rendering of audio content at a client device (e.g., the client device 110 of FIG. 1). The system can determine whether to initiate the rendering of the audio content at the client device based on, for example, receiving a user input to initiate rendering of audio content at the client device. For instance, the user input can be based on the user accessing a software application (e.g., a first-party software application or a third-party software application) that is capable of rendering audio content, directing user input to the software application to initiate the rendering of the multimedia content after the software application has already been accessed, providing a voice command to initiate the rendering of the multimedia content, and/or received in other manners. If, at an iteration of block 510, the system determines not to initiate the rendering of the audio content at the client device, then the system can continue monitoring for whether to initiate the rendering of the multimedia content at the client device at block 510. If, at an iteration of block 510, the system determines to initiate the rendering of the audio content at the client device, then the system can proceed to block 515.

At block 515, the system receives one or more contextual signals associated with a current context. The current context may be of the client device or of a user of the client device. For example, the system (e.g., the context engine 113 of FIG. 1 or 2) can obtain and/or generate contextual data that is associated with the user of the client device or the client device itself.

At block 520, the system determines, based on the one or more contextual signals, whether the client device is in a predefined context. For instance, the system may perform the operations of block 520 in the same or similar manner described above with respect to blocks 315-330 of the method 300 of FIG. 3, utilizing an LLM. However, in some instances the system may determine whether the client device is in a predefined context in a different manner described above with respect to blocks 315-330 of the method 300 of FIG. 3, for example without utilizing an LLM. As an example, the system may compare the one or more contextual signals to one or more corresponding contextual signals that have been predefined and are associated with the predefined context.

If, at an iteration of block 520, the system determines that the client device or the user of the client device is not in the predefined context, then the system can proceed to block 525. If, at an iteration of block 520, the system determines that the client device or the user of the client device is in the predefined context, then the system can proceed to block 535.

At block 525, and responsive to a determination at block 520 that that the client device is not in the predefined context, the system causes the client device to initiate rendering of the audio content. The audio content is initially rendered at a first playback volume $V_1$. In some implementations, the first playback volume $V_1$ may be a default playback volume (e.g., a playback volume at which the client device is arranged to play the audio content by default). In other implementations, the first playback volume $V_1$ may be the current playback volume of the client device (e.g., the most recent playback volume set by the client device or a user of the client device). The system may cause the audio content to be rendered at the client device at the first playback volume $V_1$ (i.e. without changing the playback volume from $V_1$) until the user provides an input to adjust the playback volume or until rendering of the audio content is terminated (e.g., due to rendering of the audio data being complete or due to the user providing a user input to terminate the rendering).

On the other hand, at block 535, and responsive to a determination at block 520 that that the client device is in the predefined context, the system causes the client device to initiate rendering the audio content at a second, reduced playback volume $V_2$ that is lower than $V_1$. Following block 535, the system proceeds to block 540 at which the system causes the client device to subsequently ramp up the playback volume.

In some implementations, for example as shown in FIG. 5, the system may proceed back to block 510 after block 525 and/or block 540, where it is determined, at block 510, whether to initiate rendering of further audio content at the client device. The further audio content may be different audio content to the audio content rendered at block 525 or block 540 (e.g., the further audio content corresponds to a different song to the audio content rendered at block 525 or block 540), or it may be the same audio content (e.g., the further audio content corresponds to the same song as the audio content rendered at block 525 or block 540). In these implementations, the method 500 may wait until rendering of the audio content has finished before moving from block 525 or block 540 to block 510. In some other implementations, the method 500 may terminate after block 525 or block 540.

Although the method 500 is depicted as including particular operations in a particular order, it should be understood that is for the sake of example and is not meant to be limiting. Further, additional operations not depicted in the method 500 may additionally or alternatively be included.

Figure 6A:
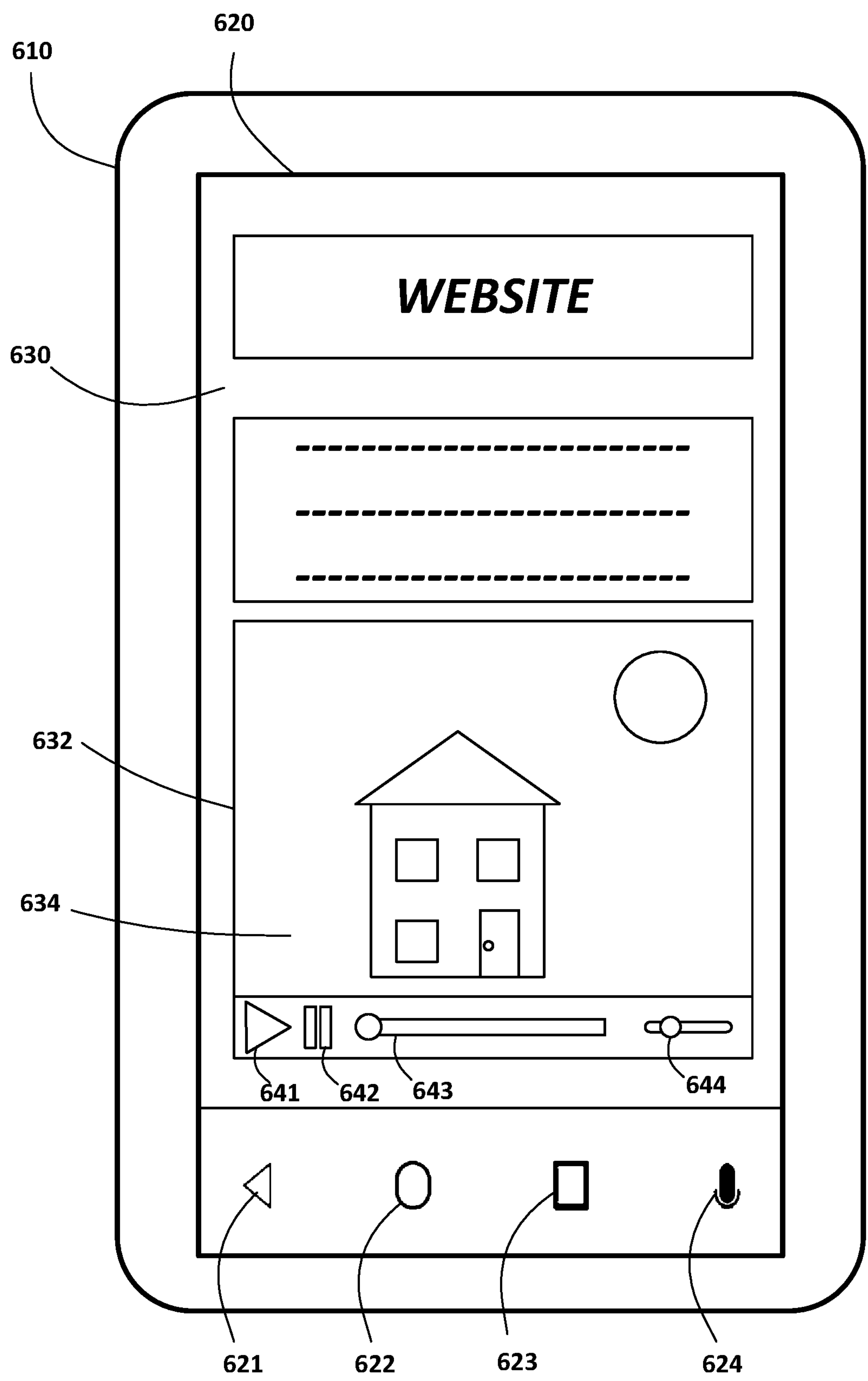
FIGS. 6A, 6B, and 6C depict various non-limiting examples of modifying one or more settings of a client device, in accordance with various implementations.
Figure 6B:
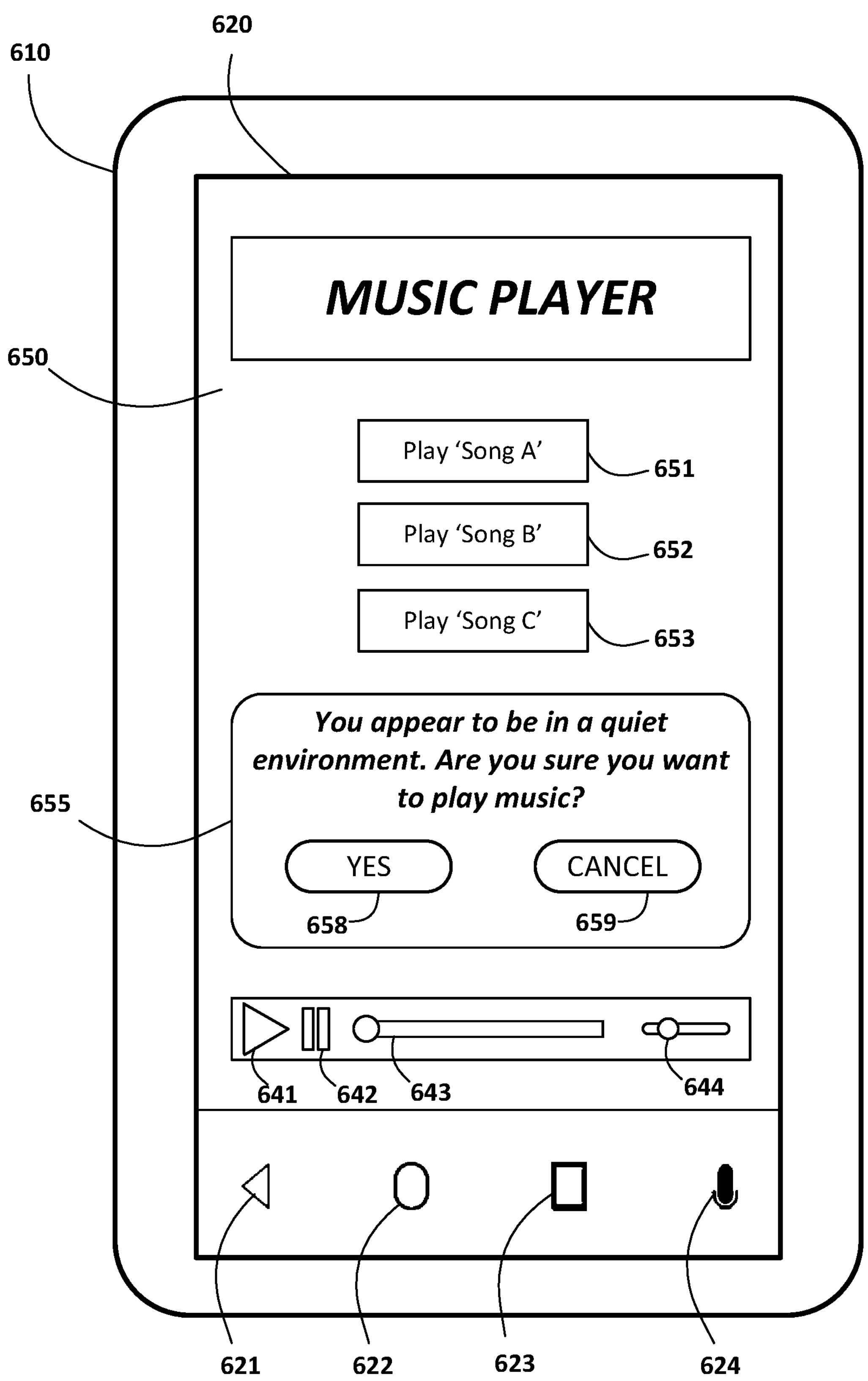
Figure 6C:
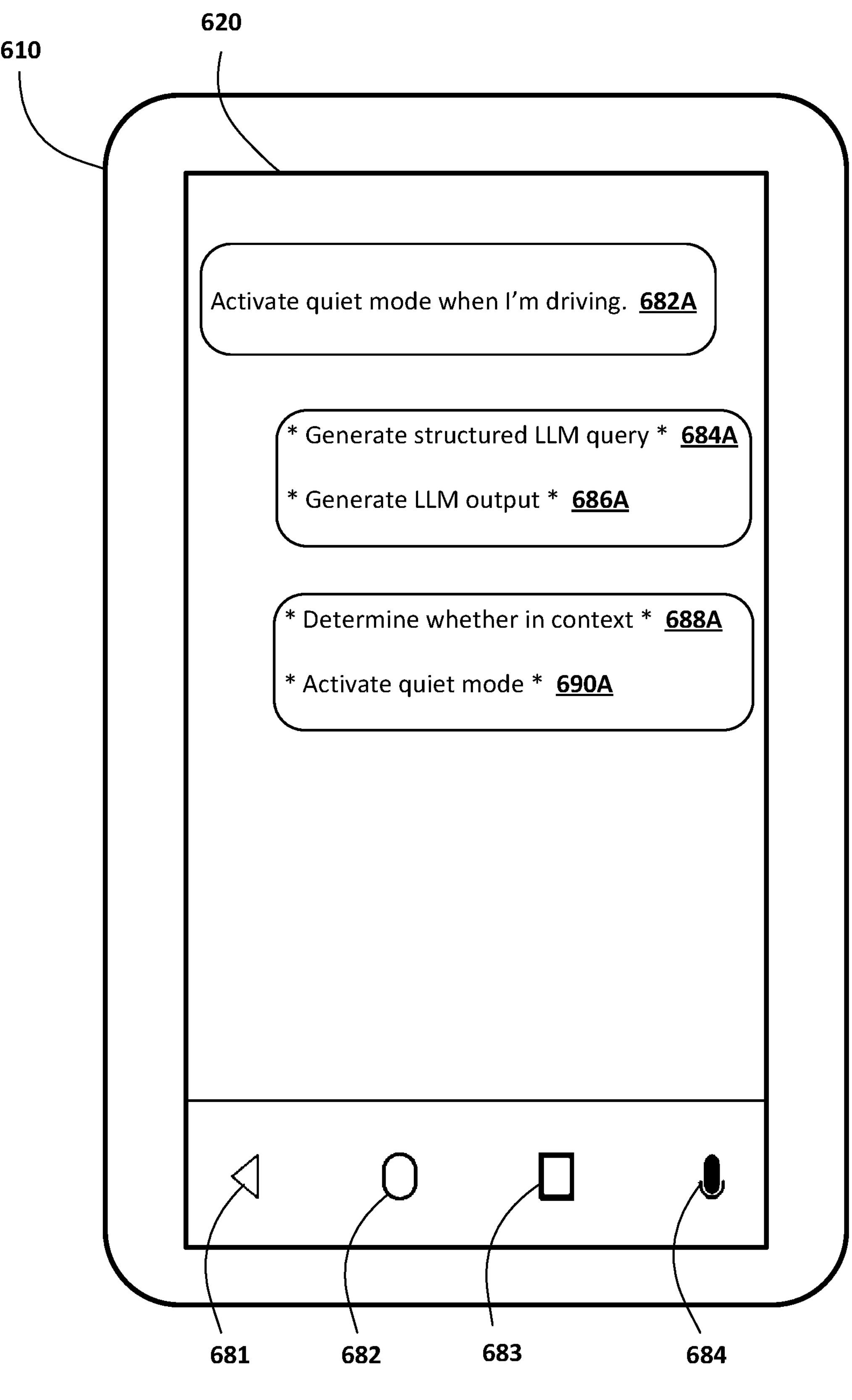

Turning now to FIGS. 6A, 6B and 6C, various non-limiting examples of determining whether a client device or a user of the client device is in a particular context are depicted. A client device 610 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and a display 620 to visually render visual output. Further, the display 620 of the client device 610 can include various system interface elements 621, 622, 623, 624 (e.g., hardware and/or software interface elements) that may be interacted with by a user of the client device 610 to cause the client device 610 to perform one or more actions. The display 620 of the client device 610 enables the user to interact with content rendered on the display 620 by touch input (e.g., by directing user input to the display 620 or portions thereof (e.g., to a text entry box, to a keyboard, or to other portions of the display 620) and/or by spoken input (e.g., by selecting microphone interface element—or just by speaking without necessarily selecting the microphone interface element (i.e., an automated assistant may monitor for one or more terms or phrases, gesture(s) gaze(s), mouth movement(s), lip movement(s), and/or other conditions to activate spoken input) at the client device 610). Although the client device 610 depicted in FIGS. 6A, 6B and 6C is a mobile phone, it should be understood that is for the sake of example and is not meant to be limiting.

Referring specifically to FIG. 6A, the client device 610 is running a software application that is capable of rendering media content such as audio content. In this example, the software application comprises a web application 630. The web application 630 is being run through a web browser application of the client device 610 and is being visually rendered at the display 620. The web application 630 includes a media player 632, which can be used to render media content 634 (which in this example includes visual content and audio content). The software application can include selectable graphical elements 641, 642, 643, 644 that are visually rendered at the display 620. For example, the software application can include a selectable graphical element 641 that, when selected, indicates that the user wishes to initiate rendering of the media content 634. As another example, the software application can include a selectable graphical element 642 that, when selected, indicates that the user wishes to pause or terminate rendering of the media content 634. As yet another example, the software application can include a selectable graphical element 643 that may visually indicate a playback position of the media content 634 and that, when selected, indicates that the user wishes to scroll forward or scroll back through the media content 634. As yet another example, the software application can include a selectable graphical element 644 that may indicate a playback volume of the media content 634 and that, when selected, indicates that the user wishes to modify the playback volume of the media content 634 (e.g., to reduce or increase the playback volume at which audio content is rendered by the client device 610).

Assume that the web application 630 is arranged to auto-play the media content 634, that is, the web application 630 is arranged to automatically initiate rendering of the media content 634 without first receiving an explicit input from the user to initiate the rendering (e.g., an explicit user input provided via selection of the selectable graphical element 641). For example, the web application 630 may be arranged to automatically initiate rendering of the media content 634 responsive to the web application 630 being launched, responsive to the media content 634 being fully or partially cached (e.g., locally at the client device 610 and/or at a server hosting a portion of the web application 630), responsive to a current time of a day, and/or responsive to another suitable input. Such auto-playing of the media content, particularly where it comprises audio content, may be undesirable when the client device 610 or the user of the client device 610 is in a particular context, for example when the user is asleep, when the client device 610 is in a library, when the user is on a train, and/or when the client device 610 is in an environment where a presentation or speech is taking place.

Assume that a predefined user context of 'user is driving' has been previously defined by the user. Furthermore, assume that the user previously associated that predefined context with a desired action of modifying one or more audio content playback settings of the client device 610, wherein the action is to be performed when it is determined by the client device 610 that the user is in the predefined context of 'user is driving'. More specifically, the predefined context may have been associated with an action of causing a playback volume for rendering audio content at the client device 610 to be reduced. The user may have set this action to be performed responsive to the client device 610 determining that the user is in the context of 'user is driving' in order to prevent the rendering of loud sounds by the client device 610 while the user is driving, wherein such louds may be distracting to the user.

The client device 610 causes a structured LLM query to be generated (e.g., as previously described in relation to the structured LLM query engine 181 of FIG. 1 or 2 or the method 300 of FIG. 3) based on one or more contextual signals associated with a current context of the client device 610 or the user of the client device 610, and based on the predefined context of 'user is driving'. The one or more contextual signals could include, for example, a current velocity of the client device 610, a current time, a current heart rate of the user (e.g., as measured by a heart rate sensor of the client device 610 or a smart watch being worn by the user and that is in wireless communication with the client device 610), and a current ambient noise level as measured by the client device 610. It should be understood that these contextual signals have been provided for the sake of example and are not meant to be limiting.

A non-limiting example of the structured LLM query could be "Based on a user's mobile phone having a velocity of 70 km/h, the current time being 5:30 PM, the user's heart rate being 80 bpm, and the ambient noise level near the mobile phone being 70 dB, does it appear that the user is driving?". The structured LLM query is subsequently processed (e.g., as previously described in relation to the LLM engine 150A1/150A2 of FIG. 1 or 2 or the method 300 of FIG. 3) using an LLM (e.g., an LLM that is fine-tuned as described above with respect to FIG. 1) to generate an LLM output that includes an indication of whether the client device 610 or the user is in the predefined context (i.e., the 'user is driving'). For example, an LLM output of "Yes" may be generated, based on the LLM determining that the contextual signals are indeed indicative of the user being in the context 'user is driving'. In response to the positive determination that user is in the predefined context of 'user is driving', the action of modifying one or more audio content playback settings of the client device 610 may be performed. Specifically, the playback volume for rendering audio content at the client device 610 is caused to be reduced. By reducing the playback volume before the web application 630 begins auto-playing the media content 634, the likelihood of the user being distracted or startled by loud audio being rendered by the client device 610 may be reduced, which may improve driving safety.

As another example, and referring specifically to FIG. 6B, the client device 610 is running a software application that is a music player application 650, wherein the music player application 650 is capable of rendering audio content such as songs or podcasts. In this example, the software application is causing selectable graphical elements 641, 642, 643, 644 (e.g., as previously described in relation to FIG. 6A) to be visually rendered at the display 620.

The software application also includes selectable graphical elements 651, 652, 653 that, when selected, indicate that the user wishes to initiate rendering at the client device 610 of audio content associated with the particular selectable graphical element 651, 652, 653 that has been selected. As an example, the software application can include a selectable graphical element 651 that, when selected, provides a user input indicating that the user wishes to initiate rendering of first audio content, 'Song A', a selectable graphical element 652 that, when selected, provides a user input indicating that the user wishes to initiate rendering of second audio content, 'Song B', and a selectable graphical element 653 that, when selected, provides a user input indicating that the user wishes to initiate rendering of third audio content, 'Song C'. Although the example of FIG. 6B is described with respect to the presence of three selectable graphical elements 651, 652, 653 for indicating that the user wishes to initiate rendering of audio content, it should be understood that is for the sake of example and is not meant to be limiting. For example, fewer or greater than three selectable graphical elements 651, 652, 653 may instead be present.

Assume that the user provides a user input to initiate rendering of the audio content 'Song A' by selecting the selectable graphical element 653 on the display 620. In this example, the user selecting the selectable graphical element 653 to initiate rendering of 'Song A' is utilized as trigger to generate a structured LLM query (e.g., utilizing the triggering engine 184 as previously described in relation to FIG. 1 or 2 or the method 300 of FIG. 3). The structured LLM query is generated (e.g., as previously described in relation to the structured LLM query engine 181 of FIG. 1 or 2 or the method 300 of FIG. 3) based on a predefined context of the client device 610 or the user, and one or more contextual signals associated with a current context of the client device 610 or the user. For example, the predefined context may be a predefined client device context of 'mobile phone is at a cinema' that has been previously set by the user, and the contextual signals may comprise a calendar entry indicating that the user of the client device 610 is at a cinema, an ambient noise level indicating that the client device 610 is in a quiet environment, and an ambient light level indicating the client device 610 is in a dark environment. It should be understood that the predefined context and these contextual signals have been provided for the sake of example and are not meant to be limiting.

The structured LLM query is processed (e.g., as previously described in relation to the LLM engine 150A1/150A2 of FIG. 1 or 2 or the method 300 of FIG. 3) using an LLM (e.g., an LLM that is fine-tuned as described above with respect to FIG. 1) to generate an LLM output that includes an indication of whether the client device 610 or the user is in the predefined context. In this example, the LLM may have determined, based on the contextual signals and the predefined context, to output an indication of the client device 610 being in the predefined context of 'mobile phone is at a cinema'. Accordingly, it may be determined based on processing the indication that the client device 610 is in the predefined context and, in response to such a positive determination, one or more audio content playback settings of the client device 610 should be modified, in accordance with an action previously set by the user.

In this example, modifying the one or more audio content playback settings comprises causing a notification 655 to be rendered at the client device 610 prior to the audio content being rendered (i.e., prior to rendering 'Song A'). FIG. 6B depicts the notification 655 as a visual notification rendered at the display 620 of the client device 610 and comprising a message of "You appear to be in a quiet environment. Are you sure you want to play music?". The notification 655 may inform the user that they (or the client device 610) are determined to be in the particular context (e.g., the client device 610 is in the context 'mobile phone is at a cinema').

Modifying the one or more audio content playback settings may further comprise inhibiting rendering of the audio content until an indication of a user input to initiate rendering of the audio content at the client device 610 is received, wherein the indication is to be received subsequent to causing the notification 655 to be rendered. For example, FIG. 6B shows the notification 655 comprising a selectable graphical element 658 that, when selected by the user, provides the indication of the user input to initiate rendering of the audio content. Responsive to receiving the indication of the user input (i.e. by the user selecting the selectable graphical element 658), the client device 610 may be caused to initiate the rendering of the audio content (i.e., begin playing 'Song A'). In the example of FIG. 6B, the user selection of the selectable graphical element 658 would be the second user input provided for initiating rendering of the audio content, wherein the first user input was the previous selection of the selectable graphical element 651. As such, the provision of the notification 655 and the selectable graphical element 658 have provided the user with an opportunity to confirm whether they still wish to proceed with rendering the audio content, despite the client device 610 being deemed to be in the context 'mobile phone is at a cinema'. However, in other examples, the user selection of the selectable graphical element 658 may be the first user input provided to initiate rendering of the audio content, for example where the software application has attempted to auto-play the audio content without first receiving an explicit user input to initiate rendering of the audio content. In such examples, the prevention of the audio content from being auto-played and the provision of the notification 655 and the selectable graphical element 658 together provide the user with an opportunity to confirm whether the audio content should be rendered, wherein such an opportunity may not have otherwise been provided if the audio content had been auto-played.

In the example of FIG. 6B, the notification 655 further comprises a selectable graphical element 659 which the user may select to acknowledge (i.e. dismiss) the notification 655, without causing the audio content to be rendered.

Turning to FIG. 6C, another example of the client device 610 is depicted. Assume that an NL based input 682A of "Activate quiet mode when I'm driving" has been provided to the client device 610, for example by a user providing the NL based input 682A via a microphone of the client device 610 or via touch input to the client device 610. The NL based input 682A includes a description of a context of the user, in this example "I'm driving". The NL based input 682A also includes an indication of an action to be taken when the user is in the context, in this example "activate quiet mode". Assume that the action of "activate quiet mode" corresponds to modifying one or more settings of the client device 610, for example causing a playback volume for rendering audio content to be reduced. The action of "activate quiet mode" may have been predefined, for example by the user, prior to the NL based input 682A being provided. However, the context of "I'm driving" may not have been previously defined, and it may not be initially apparent to the client device 610 how it could determine whether the user is in the context of "I'm driving". As such, a structured LLM query is generated (e.g., as previously described in relation to the structured LLM query engine 181 of FIG. 1 or 2, or the method 400 of FIG. 4) based on the description of the context, as indicated by 684A. The structured LLM query may have been generated responsive to receipt of the NL based input 682A, responsive to receipt of a different user input, responsive to receipt of a non-user input, and/or on another basis. In some examples, the structured LLM query may also be generated based on additional data, for example an indication of one or more sensors of the client device 610 that could be used to generate contextual signals for determining whether the client device 610 or the user is in the context (i.e., the context described in the NL based input 682A). In accordance with the example of FIG. 6C, a non-limiting example of a structured LLM query could be "Based on a user having a mobile phone with a microphone and an accelerometer, what contextual signals could be used to determine the user is in the context of "I'm driving?".

The structured LLM query is processed (e.g., as previously described in relation to the LLM engine 150A1/150A2 of FIG. 1 or 2, or the method 400 of FIG. 4) using an LLM (e.g., an LLM that is fine-tuned as described above with respect to FIG. 1) to generate an LLM output that includes an indication of one or more expected contextual signals that are indicative of the client device 610 or the user being in the context, as indicated by 686A. In accordance with the example of FIG. 6C, a non-limiting example of the LLM output may comprise "Microphone detects car engine sound, microphone detects ambient noise level greater than 60 dB, and accelerometer detects acceleration greater than 3 $m/s^2$." As such, the LLM has provided the client device 610 with suggestions of contextual signals that could be monitored to determine whether the client device 610 or the user is in the context described in the NL based input 682A. This can allow for greater flexibility in the defining of new contexts for a client device 610 and/or user. Furthermore, in instances where the structured LLM query is also generated based on an indication of one or more sensors of the client device 610, this may improve the likelihood of the LLM providing, as part of the LLM output, expected contextual signals that are of relevance to the client device 610 (i.e., that could be monitored using one or more sensors of the client device 610, such as the sensor(s) 118 of FIG. 1 or 2).

Based on the one or more expected contextual signals indicated in the LLM output and one or more current contextual signals associated with the client device 610 or the user, a determination is made as to whether the user is in the context "I'm driving", as indicated by 688A. For example, the client device 610 may determine whether the current contextual signals sufficiently correspond to the expected contextual signals, such as by comparing a current ambient noise level detected by the microphone of the client device 610 to the expected noise level of greater than 60 dB, comparing a current acceleration detected by the accelerometer of the client device 610 to the expected acceleration of greater than 3 $m/s^2$, and comparing a current type of noise being detected by the microphone of the client device 610 to the expected type of noise of "car engine sound".

Responsive to a positive determination that the user is in the context "I'm driving", the action of "activate quiet mode" is caused to be performed, as indicated by 690A. That is, a playback volume for rendering audio content is caused to be reduced.

Although the example of FIG. 6C depicts a transcript of the NL based input 682A and various actions 684A, 686A, 688A, 690A, it should be understood that is for the sake of example and is not meant to be limiting, for example in some instances no transcript of the NL based input 682A and/or various actions 684A, 686A, 688A, 690A may be provided.

Further, although the examples of FIGS. 6A, 6B and 6C are generally described with respect to modifying one or more audio content playback settings of a client device 610 for rendering audio content, it should be understood that is for the sake of example and is not meant to be limiting. Rather, it should be understood that other settings of a client device 610 are contemplated to be modified alternatively to, or in addition to, audio content playback settings. In some implementations, for example, modifying one or more settings of the client device 610 may comprise modifying a power setting of the client device 610, such as by transitioning the client device 610 from a normal power mode to a low-power mode (i.e. battery-saving mode), or vice versa. Additionally or alternatively, in some implementations, for example, modifying one or more settings of the client device 610 may comprise modifying a flight mode setting of the client device 610, such as by transitioning the client device 610 (e.g. mobile phone) from a normal mode to a flight mode, or vice versa. Additionally or alternatively, in some implementations, for example, modifying one or more settings of the client device 610 may comprise modifying a wireless connection setting of the client device 610, such as by switching on or off a cellular connection, a WiFi connection and/or a Bluetooth connection of the client device 610 (e.g. mobile phone).

Figure 7:
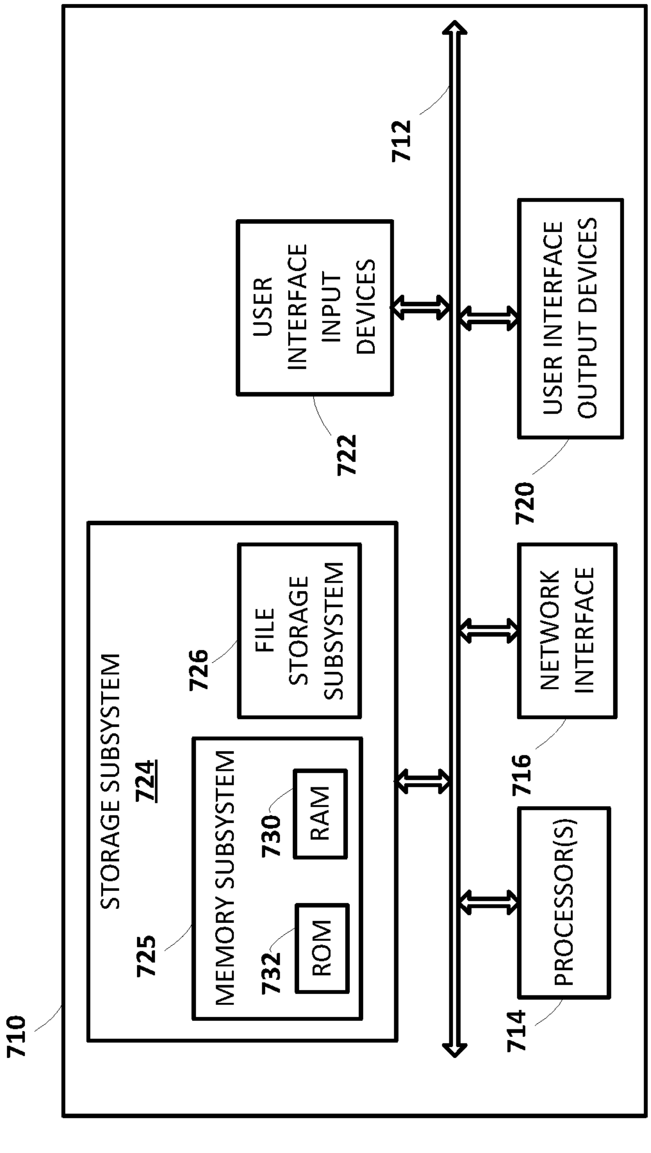
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges.

The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving one or more contextual signals associated with a current context of a client device or a user of the client device; generating, based on the one or more contextual signals and a predefined context of the client device or the user of the client device, a structured large language model (LLM) query; generating, based on processing the structured LLM query, an LLM output that includes an indication of whether the client device or the user is in the predefined context; determining, based on processing the indication, whether the client device or the user is in the predefined context; and responsive to determining that the client device or the user is in the predefined context, modifying one or more audio content playback settings of the client device for rendering audio content.

These and other implementations of technology disclosed herein can optionally include one or more of the following features.

In some implementations, the method can further include, subsequent to modifying the one or more audio content playback settings of the client device, causing the client device to initiate the rendering of the audio content based on the modified one or more media content playback settings.

In some implementations, generating the structured LLM query can be performed responsive to receiving a user input to initiate rendering of the audio content at the client device.

In additional or alternative versions of those implementations, generating the structured LLM query can be performed responsive to a software application capable of rendering audio content being launched.

In additional or alternative versions of those implementations, generating the structured LLM query can be performed responsive to receipt of an indication that the software application will auto-play the audio content.

In some implementations, modifying the one or more audio content playback settings of the client device can comprise causing a playback volume for rendering the audio content to be reduced.

In some versions of those implementations, modifying the one or more audio content playback settings of the client device can further comprises causing the playback volume to be ramped up after being reduced.

In some versions of those implementations, a rate at which the playback volume is ramped up can be selected based on the predefined context.

In some implementations, modifying the one or more audio content playback settings of the client device can comprise inhibiting rendering of the audio content.

In some versions of those implementations, modifying the one or more audio content playback settings of the client device can further comprise causing a notification to be visually rendered at the client device prior the audio content being rendered, and the method can further comprise: receiving an indication of a user input to initiate rendering of the audio content at the client device, the indication received subsequent to causing the notification to be visually rendered at the client device; and responsive to receiving the indication of the user input, causing the client device to initiate rendering of the audio content.

In some implementations, the one or more contextual signals comprise an ambient noise level in an environment of the client device.

In additional or alternative versions of those implementations, the one or more contextual signals comprise a type of noise detected in the environment of the client device.

In additional or alternative versions of those implementations, the one or more contextual signals comprise a location of the client device.

In additional or alternative versions of those implementations, the one or more contextual signals comprise a location of the user.

In additional or alternative versions of those implementations, the one or more contextual signals comprise a current time.

In additional or alternative versions of those implementations, the one or more contextual signals comprise a current day.

In additional or alternative versions of those implementations, the one or more contextual signals comprise a calendar entry.

In some implementations, at least one contextual signal of the one or more contextual signals is received from an additional client device that is associated with the client device or the user.

In some implementations, the method can further comprise receiving one or more confidence indicators. Each confidence indicator of the one or more confidence indicators can correspond to a respective contextual signal of the one or more contextual signals and can be indicative of a confidence in the respective contextual signal being accurate. Furthermore, generating the structured LLM query can be further based on the one or more confidence indicators.

In some implementations, a method implemented by one or more processors is provided, and includes receiving a natural language (NL) based input, the NL based input comprising a description of a context, the context being of a client device or a user of the client device; generating, based on at least the description of the context, a structured large language model (LLM) query; generating, based on processing the structured LLM query, an LLM output that includes one or more expected contextual signals that are indicative of the client device or the user being in the context; receiving one or more current contextual signals associated with at least one of the client device and the user of the client device; determining, based on the one or more current contextual signals and the one or more expected contextual signals, whether the client device or the user of the client device is in the context; and responsive to determining that the client device or the user of the client device is in the context, modifying one or more settings of the client device.

These and other implementations of technology disclosed herein can optionally include one or more of the following features.

In some implementations, modifying the one or more settings of the client device can comprise modifying one or more audio content playback settings of the client device for rendering audio content.

In some implementations, generating the structured LLM query can be further based on an indication of one or more sensors of the client device.

In some further versions of those implementations, each expected contextual signal of the one or more expected contextual signals can indicate a corresponding sensor of the client device that can be used to generate at least one of the one or more current contextual signals.

In some implementations, determining whether the client device or the user of the client device is in the context can comprise performing a comparison between the one or more current contextual signals and the one or more expected contextual signals.

In some implementations, the one or more current contextual signals have been selected based on the one or more expected contextual signals.

In some implementations, the one or more current contextual signals comprise an ambient noise level in an environment of the client device.

In additional or alternative versions of those implementations, the one or more current contextual signals comprise a type of noise detected in the environment of the client device.

In additional or alternative versions of those implementations, the one or more current contextual signals comprise a location of the client device.

In additional or alternative versions of those implementations, the one or more current contextual signals comprise a location of the user.

In additional or alternative versions of those implementations, the one or more current contextual signals comprise a current time.

In additional or alternative versions of those implementations, the one or more current contextual signals comprise a current day.

In additional or alternative versions of those implementations, the one or more current contextual signals comprise a calendar entry.

In some implementations, at least one contextual signal of the one or more current contextual signals is received from an additional client device that is associated with the client device or the user.

In some implementations, a method implemented by one or more processors is provided, and includes receiving a user input to initiate rendering of audio content at a client device; receiving one or more contextual signals associated with a current context of the client device or a user of the client device; determining, based on the one or more contextual signals, whether the client device or the user is in a predefined context; and responsive to receiving the user input and determining that the client device or the user is in the predefined context, cause the client device to initiate rendering the audio content at a reduced playback volume and subsequently ramp up the playback volume.

These and other implementations of technology disclosed herein can optionally include one or more of the following features.

In some implementations, a rate at which the playback volume is ramped up is selected based on the predefined context.

In some implementations, the one or more contextual signals comprise an ambient noise level in an environment of the client device.

In additional or alternative versions of those implementations, the one or more contextual signals comprise a type of noise detected in the environment of the client device.

In additional or alternative versions of those implementations, the one or more contextual signals comprise a location of the client device.

In additional or alternative versions of those implementations, the one or more contextual signals comprise a location of the user.

In additional or alternative versions of those implementations, the one or more contextual signals comprise a current time.

In additional or alternative versions of those implementations, the one or more contextual signals comprise a current day.

In additional or alternative versions of those implementations, the one or more contextual signals comprise a calendar entry.

In some implementations, at least one contextual signal of the one or more contextual signals is received from an additional client device that is associated with the client device or the user.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving one or more contextual signals associated with a current context of a client device or a user of the client device;

generating, based on the one or more contextual signals and a predefined context of the client device or the user of the client device, a structured large language model (LLM) query;

generating, based on processing the structured LLM query, an LLM output that includes an indication of whether the client device or the user is in the predefined context;

determining, based on processing the indication, whether the client device or the user is in the predefined context; and responsive to determining that the client device or the user is in the predefined context, modifying one or more audio content playback settings of the client device for rendering audio content, wherein modifying the one or more audio content playback settings of the client device comprises:

causing a playback volume for rendering the audio content to be reduced, and causing the playback volume to be ramped up after being reduced, wherein a rate at which the playback volume is ramped up is selected based on the predefined context.

2. The method of claim 1, further comprising:

subsequent to modifying the one or more audio content playback settings of the client device, causing the client device to initiate the rendering of the audio content based on the modified one or more audio content playback settings.

3. The method of claim 1, wherein generating the structured LLM query is performed responsive to receiving a user input to initiate rendering of the audio content at the client device.

4. The method of claim 1, wherein the one or more contextual signals comprise at least one of an ambient noise level in an environment of the client device and a type of noise detected in the environment of the client device.

5. The method of claim 1, wherein the one or more contextual signals comprise at least one of a location of the client device, a location of the user, a current time, a current day, or a calendar entry.

6. The method of claim 1, wherein at least one contextual signal of the one or more contextual signals is received from an additional client device that is associated with the client device or the user.

7. The method of claim 1, further comprising:

receiving one or more confidence indicators, each confidence indicator of the one or more confidence indicators corresponding to a respective contextual signal of the one or more contextual signals and being indicative of a confidence in the respective contextual signal being accurate, wherein generating the structured LLM query is further based on the one or more confidence indicators.

8. A method implemented by one or more processors, the method comprising:

receiving a natural language (NL) based input, the NL based input comprising a description of a context, the context being of a client device or a user of the client device;

generating, based on at least the description of the context, a structured large language model (LLM) query;

generating, based on processing the structured LLM query, an LLM output that includes one or more expected contextual signals that are indicative of the client device or the user being in the context;

receiving one or more current contextual signals associated with at least one of the client device and the user of the client device;

determining, based on the one or more current contextual signals and the one or more expected contextual signals, whether the client device or the user of the client device is in the context; and responsive to determining that the client device or the user of the client device is in the context, modifying one or more settings of the client device.

9. The method of claim 8, wherein modifying the one or more settings of the client device comprises modifying one or more audio content playback settings of the client device for rendering audio content.

10. The method of claim 8, wherein generating the structured LLM query is further based on an indication of one or more sensors of the client device.

11. The method of claim 10, wherein each expected contextual signal of the one or more expected contextual signals indicates a corresponding sensor of the client device that can be used to generate at least one of the one or more current contextual signals.

12. The method of claim 8, wherein determining whether the client device or the user of the client device is in the context comprises performing a comparison between the one or more current contextual signals and the one or more expected contextual signals.

13. The method of claim 8, wherein the one or more current contextual signals have been selected based on the one or more expected contextual signals.

14. A method implemented by one or more processors, the method comprising:

receiving a user input to initiate rendering of audio content at a client device;

receiving one or more contextual signals associated with a current context of the client device or a user of the client device;

determining, based on the one or more contextual signals, whether the client device or the user is in a predefined context; and responsive to receiving the user input and determining that the client device or the user is in the predefined context, causing the client device to initiate rendering the audio content at a reduced playback volume and subsequently ramp up the playback volume, wherein a rate at which the playback volume is ramped up is selected based on the predefined context.

15. The method of claim 14, wherein the one or more contextual signals comprise an ambient noise level in an environment of the client device.

16. The method of claim 14, wherein the one or more contextual signals comprise a type of noise detected in an environment of the client device.

17. The method of claim 14, wherein the one or more contextual signals comprise a location of the client device.

18. The method of claim 14, wherein the one or more contextual signals comprise a calendar entry.

19. The method of claim 14, wherein at least one contextual signal of the one or more contextual signals is received from an additional client device that is associated with the client device or the user.

* * * * *